US011598638B2

(12) United States Patent
Georgy et al.

(10) Patent No.: US 11,598,638 B2
(45) Date of Patent: Mar. 7, 2023

(54) METHODS OF ATTITUDE AND MISALIGNMENT ESTIMATION FOR CONSTRAINT FREE PORTABLE NAVIGATION

(71) Applicants: Jacques Georgy, Calgary (CA); Zainab Syed, Calgary (CA); Christopher Goodall, Calgary (CA); Mohamed Atia, Calgary (CA); Aboelmagd Noureldin, Calgary (CA); Naser El-Sheimy, Calgary (CA)

(72) Inventors: Jacques Georgy, Calgary (CA); Zainab Syed, Calgary (CA); Christopher Goodall, Calgary (CA); Mohamed Atia, Calgary (CA); Aboelmagd Noureldin, Calgary (CA); Naser El-Sheimy, Calgary (CA)

( * ) Notice: Subject to any disclaimer, the term of this patent is extended or adjusted under 35 U.S.C. 154(b) by 235 days.

(21) Appl. No.: 16/185,936

(22) Filed: Nov. 9, 2018

(65) Prior Publication Data
US 2019/0086211 A1    Mar. 21, 2019

Related U.S. Application Data

(62) Division of application No. 13/426,884, filed on Mar. 22, 2012, now Pat. No. 10,203,207.

(60) Provisional application No. 61/466,840, filed on Mar. 23, 2011.

(51) Int. Cl.
*G01C 21/16*    (2006.01)
*G01C 25/00*    (2006.01)
*G01C 21/20*    (2006.01)

(52) U.S. Cl.
CPC ......... *G01C 21/165* (2013.01); *G01C 21/206* (2013.01); *G01C 25/005* (2013.01)

(58) Field of Classification Search
CPC ... G01C 21/165; G01C 21/206; G01C 25/005
See application file for complete search history.

(56) References Cited

U.S. PATENT DOCUMENTS

| 2009/0254279 A1* | 10/2009 | Han | G01C 21/28 701/501 |
| 2010/0309044 A1* | 12/2010 | Ische | G01S 19/071 342/357.28 |

OTHER PUBLICATIONS

CURE Algorithm, Wikipedia, accessed Nov. 2010 (Year: 2010).*

* cited by examiner

*Primary Examiner* — Mahmoud S Ismail
*Assistant Examiner* — Gabriel Anfinrud

(57) ABSTRACT

The present disclosure relates to methods of enhancing a navigation solution about a device and a platform, wherein the mobility of the device may be constrained or unconstrained within the platform, and wherein the navigation solution is provided even in the absence of normal navigational information updates (such as, for example, GNSS). More specifically, the present method comprises utilizing measurements from sensors (e.g. accelerometers, gyroscopes, magnetometers etc.) within the device to calculate and resolve the attitude of the device and the platform, and the attitude misalignment between the device and the platform.

38 Claims, 14 Drawing Sheets

Figure 8  Different scenarios for obtaining the initial misalignment and initializing the device and platform headings.

METHODS OF ATTITUDE AND MISALIGNMENT ESTIMATION FOR CONSTRAINT FREE PORTABLE NAVIGATION

CROSS REFERENCE TO RELATED APPLICATIONS

This application claims priority to U.S. Provisional Patent Application No. 61/466,840 filed Mar. 23, 2011, the entire disclosure of which is considered to be part of the present disclosure and is hereby incorporated by reference. This application also claims priority to, and is a divisional of, U.S. patent application Ser. No. 13/426,884, filed Mach 23, 2012.

TECHNICAL FIELD

The present invention relates to methods for detecting and estimating attitude of a device and a platform (such as for example person or vehicle) and the misalignment between them for enhancing a navigation solution, wherein mobility of the device may be constrained or unconstrained within the platform.

BACKGROUND OF THE INVENTION

Inertial navigation of a platform is based upon the integration of specific forces and angular rates measured by inertial sensors (e.g. accelerometer, gyroscopes) by a device containing the sensors. In general, the device is positioned within the platform and commonly tethered to the platform. Such measurements from the device may be used to determine the position, velocity and attitude of the device and/or the platform.

The platform may be a motion-capable platform that may be temporarily stationary. Some of the examples of the platforms may be a person, a vehicle or a vessel of any type. The vessel may be land-based, marine or airborne.

Alignment of the inertial sensors within the platform (and with the platform's forward, transversal and vertical axis) is critical for inertial navigation. If the inertial sensors, such as accelerometers and gyroscopes are not exactly aligned with the platform, the positions and attitude calculated using the readings of the inertial sensors will not be representative of the platform. Fixing the inertial sensors within the platform is thus a requirement for navigation systems that provide high accuracy navigation solutions.

For tethered systems, one known means for ensuring optimal navigation solutions is to utilize careful manual mounting of the inertial sensors within the platform. However, notwithstanding such careful mounting, existing portable navigation devices (or navigation-capable devices) cannot achieve accurate attitude and position of the platform unless at least one of the following three conditions are known:
1) absolute attitude angles for the device and the platform;
2) absolute attitude angles for the device and the misalignment between the device and platform;
3) absolute attitude angles for the platform and the misalignment between the device and platform.

Some known portable navigation devices that are designed for in-vehicle navigation attempt to use the platform's velocity or acceleration along with at least one or more additional constraints to estimate the mounting misalignment between the device and the platform. A known method uses the acceleration measurements and the steering rate of the platform to estimate the misalignment. The three attitude angles are determined when the platform is accelerating or turning. This method also uses the physical constraint that the user must mount the device in approximately forward orientation within the platform to make the display of the device facing the user. Similarly, it is known to provide a method where the misalignment can be resolved if the platform velocity satisfies certain criteria and the device is not moved during the trajectory. This method utilizes non holonomic constraints which are based on the fact that during normal operation a platform, such as a land vehicle, will not skid or jump. Both of these methods calculate absolute heading for the platform using GNSS velocities.

The above methods, however, are not applicable for circumstances where the movement of the platform may not satisfy the required criterion, for example, where the platform is a person walking. Several attempts have been made to find methods that can resolve the common misalignment cases for such circumstances (e.g. mobile/smart phone based inertial navigation), such as for example, application of principle component analysis to determine the forward motion for specific orientation of the device in addition to the gravity axis to find the vertical axis of the device (the one measuring the biggest component of gravity).

For navigation, mobile/smart phones are becoming very popular as they, come equipped with Assisted Global Positioning System (AGPS) chipsets with high sensitivity capabilities to provide absolute positions of the platform (e.g. user) even in some environments that cannot guarantee clear line of sight to satellite signals. Deep indoor or challenging outdoor navigation or localization incorporates cell tower ID or, if possible, cell towers trilateration for a position fix where AGPS solution is unavailable. Despite these two positioning methods that already come in many mobile devices, accurate indoor localization still presents a challenge and fails to satisfy the accuracy demands of today's location based services (LBS). Additionally, these methods may only provide the absolute heading of the platform without any information on the device's heading.

As WiFi hotspots are present in abundance in indoor environments, fingerprinting and signal strength mapping may be implemented to determine the platform's position and heading for the challenging navigation scenarios. This is an attractive new method to avoid the shortcomings of AGPS and cell phone based positioning solution. However, frequent access point (AP) surveys are required to keep the WiFi related information up to date for acceptable positioning accuracies of mobile devices within the network of APs. Furthermore, the current available techniques need pre-knowledge about the environments and there are no known techniques for WiFi positioning in any new or user-unknown environment. WiFi based positioning and localization also provides absolute information for the platform with no information for the device.

Many mobile devices, such as mobile phones, are equipped with Micro Electro Mechanical System (MEMS) sensors that are used predominantly for screen control and entertainment applications. These sensors have been considered unusable to date for navigation purposes due to very high noise, large random drift rates, and frequently changing orientations with respect to the carrying platform or person.

Magnetometers are also found within many mobile devices. In some cases, it has been shown that a navigation solution using accelerometers and magnetometers—may be possible if the user is careful enough to keep the device in a specific orientation with respect to their body, such as when held carefully in front of the user after calibrating the magnetometer.

Some known methods to provide navigation solutions utilize the mobile device sensors and digital maps of the buildings for pure indoor navigation. Again, however, these methods require that the mobile device be kept in a specific orientation to utilize the magnetometer-based heading and the indoor maps have to be available for the buildings that the user is entering. The maps are not only used to display the positions but they may also be used to get the heading of the user and help getting the user's position.

SUMMARY

As such, there is a need for a method of accurately utilizing measurements from a device within a platform to determine a navigation solution of the platform without any constraints on the platform (i.e. in indoor or outdoor environments) or the mobility of the device. The method may be capable of reducing or removing the effects of orientation changes of the device during navigation, thereby rendering the estimation of the position of the platform independent of the usage of the device (e.g. the way the user is holding or moving the device during navigation). In addition to the above mentioned application of portable devices (that comprise a full navigation solution including position, velocity and attitude, or position and attitude), there are other applications (that may comprise estimating a full navigation solution, or an attitude only solution or an attitude and velocity solution) where the needed method is aimed at enhancing the user experience and usability, and may be applicable in a number of scenarios such as, for example:

Video gaming equipment;
Augmented reality equipment; or
Wrist watches.

The present disclosure relates to methods for enhancing a navigation solution of a device and a platform, wherein the mobility of the device may be constrained or unconstrained within the platform, and wherein the navigation solution can be provided even in the absence of normal navigational information updates (such as, for example, GPS). More specifically, the present method comprises utilizing measurements from sensors (e.g. accelerometers, gyroscopes, magnetometers etc.) within the device to calculate and resolve:

the attitude of the device and the platform, and
the attitude misalignment between the device and the platform.

As such, the present method is capable of determining the absolute attitude of both the device and the platform, and utilizing same to enhance a navigation solution about the platform and/or the device, even in the absence of updates of other navigational information.

In one embodiment, the present method for enhancing a navigation solution of a device and a platform, wherein the mobility of the device is constrained or unconstrained within the platform and wherein the device comprises at least three accelerometers for providing specific forces information, wherein said accelerometers have quality specifications, comprises detecting and estimating the attitude of the device and the platform and the misalignment between the device and the platform by calculating roll and pitch of the device using specific forces measured at the device, and standard deviations thereof using the specific forces measured at the device and measured at the device and the quality specifications of the at least three accelerometers.

In another embodiment, the present method for enhancing a navigation solution for a device and a platform, wherein the mobility of the device is constrained or unconstrained within the platform, comprising detecting and estimating the attitude of the device and the platform and the misalignment between the device and the platform by estimating the absolute heading of the platform by using the time rate of change of the received signal strength (RSS) of wireless signals from wireless communication systems having at least one "access point". Preferably, reducing noise of received signal strength (RSS) measurements received from the wireless communication system is achieved before using them to estimate the absolute heading of the platform.

In yet another embodiment, the present method for enhancing a navigation solution for a device and a platform, wherein the mobility of the device is constrained or unconstrained within the platform, comprising detecting and estimating the attitude of the device and the platform and misalignment between the device and the platform by using a source of absolute velocity of the platform (such as for example GNSS) to estimate the initial misalignment of heading between the device and the platform.

In yet another embodiment, the present method for enhancing a navigation solution for a device and a platform, wherein the mobility of the device is constrained or unconstrained within the platform, comprising detecting and estimating the attitude of the device and the platform and misalignment between the device and the platform by estimating the misalignment of heading (whether initial or continued misalignment) of the platform, independent of the availability of absolute source of velocity or heading information.

In yet another embodiment, the present method for enhancing a navigation solution for a device and a platform, wherein the mobility of the device is constrained or unconstrained within the platform, the method comprising detecting and estimating the attitude of the device and the platform and the misalignment between the device and the platform by calculating continued heading misalignment between the device and the platform using a source of absolute velocity or absolute heading of the platform, where said source of absolute velocity or absolute heading may be available or interrupted.

In yet another embodiment, the present method for enhancing a navigation solution for a device and a platform, wherein the mobility of the device is constrained or unconstrained within the platform, the method comprising detecting and estimating the attitude of the device and the platform and misalignment between the device and the platform, wherein the device is capable of receiving readings related to navigational information from the platform via a wired or wireless connection.

It should be noted that the different embodiments of the present method of calculating the attitude of the device and platform and misalignment between the device and platform, either alone, together or in any combination thereof, provide means to improve the navigation solution for devices whose mobility is constrained or unconstrained within a platform.

DESCRIPTION OF EMBODIMENTS

Figure 1:
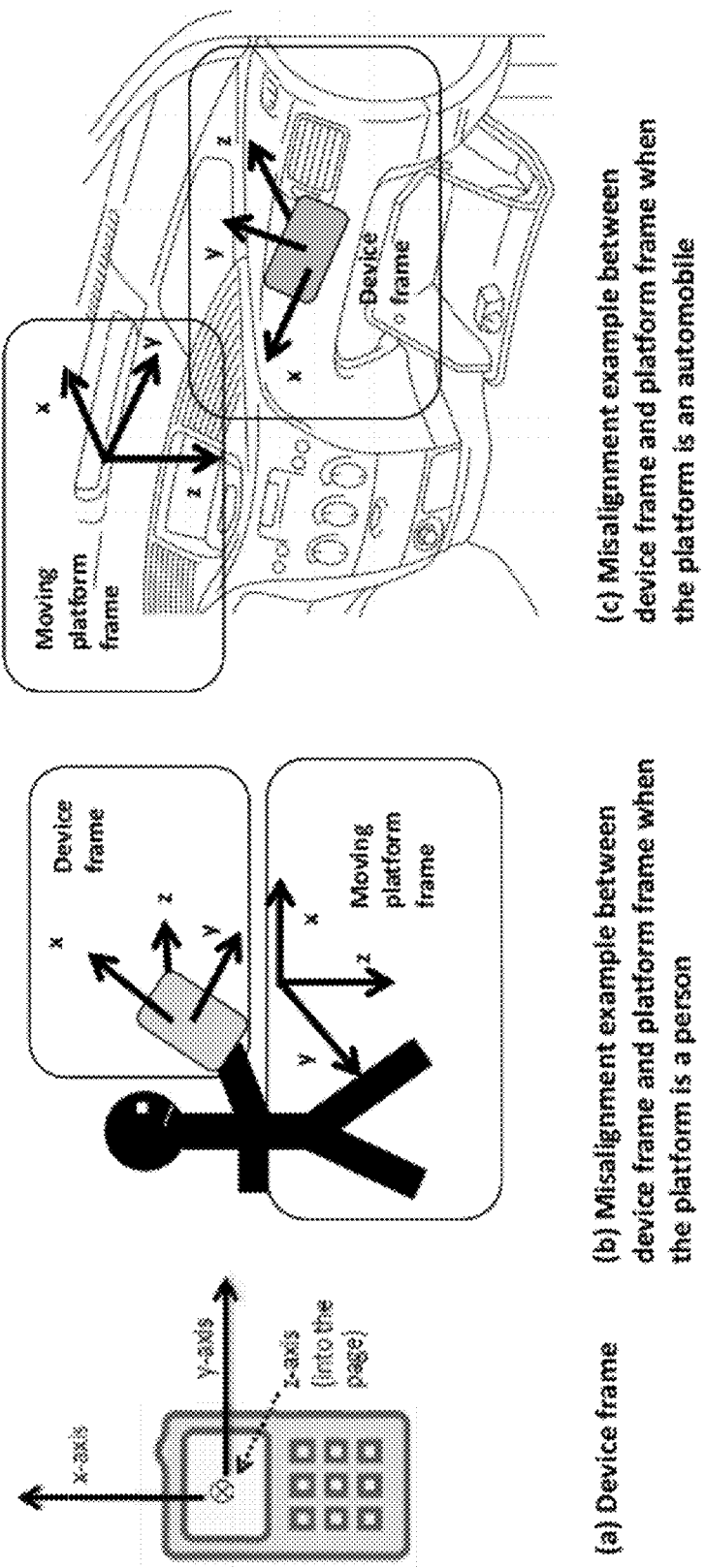
FIG. 1 shows the sensitive axes of the device (a), an exemplary depiction of misalignment between the device and the platform, where the platform is a person (b) or a vehicle (c)

Generally, the present disclosure relates to methods for enhancing a navigation solution for a device and a platform, wherein the mobility of the device is constrained or unconstrained within the platform, even in the absence of normal navigational information updates (such as, for example, GPS). The method comprises utilizing measurements from sensors within the device to calculate and resolve the attitude of the device and the platform, as well as the attitude misalignment between the device and the platform. More specifically, the present method provides means for determining the absolute attitude of both the device and the platform, even in the absence of updates of other navigational information.

The device comprises at least three accelerometers to measure specific forces about the device, at least three gyroscopes to measure the turning rates about the device, and at least one receiver to receive absolute navigational information. The receiver to receive absolute navigational information may be, for example, a Global Navigation Satellite System (GNSS) receiver that is capable of calculating the position and velocity information pertaining to the device. The device may also comprise a wireless communication system such as a system that is capable of receiving wireless communication signals and measuring their received signal strength (RSS) values, such as for example WiFi signals and their RSS values. Optionally, the device may also have a magnetometer to obtain heading of the device by measuring the earth's magnetic field and/or a barometer to obtain height of the device by measuring pressure at the device. The device may also be equipped with wired or wireless communication link that may be used to send and/or receive navigation related information from another device or platform.

The platform is a motion-capable platform that may be temporarily stationary. Some of the examples of the platforms may be a person, a vehicle or a vessel of any type. The vessel may be land-based, marine or airborne. The platform may optionally comprise a positioning system capable of calculating position, velocity and orientation, or a subset thereof, of the platform. The platform may optionally comprise sensors, such as for example, one or more of the following: (i) a speed sensor (such as For example odometer) to obtain platform speed, (ii) individual wheel speed sensors (in case of wheel-based platforms), (iii) steering rate sensor that can help obtaining the heading of the platform (in case of platform that have steering), (iv) at least one gyroscope to obtain the turning rate of the platform, (v) magnetometer to obtain heading of the platform, (vi) accelerometers to measure the specific forces about the platform. For example, where the platform is a person, some of the optional platform sensors such as accelerometers, gyroscopes, or magnetometers can be available, in a belt clip mounted on the person or a holder in a purse or backpack. The platform may also have in addition to the above, a wired or wireless communication means to send or receive the relevant information to the device.

For the sake of clarity, it is noted that some navigation solutions may contain a routine to perform what is called "inertial mechanization". The routine receives, as input, the readings of the inertial sensors or the readings of inertial sensors corrected for their errors, and has, as output, position, velocity and attitude relying on the last position, velocity and attitude.

One primary feature of the present method, which is encompassed in each embodiment of the present method provided herein, is the ability to obtain and/or enhance the attitude estimation of the device and to resolve the attitude misalignment between the frame of the device and the frame of the platform. The present method will be further defined by way of demonstrative embodiments. It is understood that the present method may comprise any individual (self-contained) embodiment alone, or any two or more embodiments in combination (see, for example, FIG. 2).

The present method can be implemented in a variety of applications, including those where the separate determination of the orientation of a device and a platform carrying the device is involved. Such applications may comprise circumstances where algorithmic constraints are applied to enhance the positioning or navigation solution (without any physical constraint on the usage of the device) such as, for example:

a. Non Holonomic Constraints with the corrections for device to platform which is the requirement.

b. Where the platform is a person (i.e. pedestrian mode of conveyance), constraints such as Pedestrian Dead Reckoning (PDR) can be applied, thereby providing improved positioning performance with low-cost sensors than the general inertial navigation. The PDR results can be used in any of the following ways:
   i. To provide measurement update for the navigation solution (in addition to the calculation of the standard deviations for these updates),
   ii. To be integrated with the navigation solution in a Least Squares sense, or
   iii. Used as the only standalone positioning and navigation solution.
c. Where platform is a person (i.e. pedestrian mode of conveyance) the misalignment is resolved, and environment maps (of any type) are available, the constraints can be used to enhance the navigation solution. This can be used if PDR is utilized to further enhance the solution, or can be used if PDR is not used to enhance the main navigation solution.
d. Where the platform is a vehicle (i.e. vehicular mode of conveyance), when the misalignment is resolved, and when vehicular sensors readings are available to the device through a wired or wireless connection, Vehicular Positioning or Navigation or Dead Reckoning (DR) can be applied to provide improved positioning performance with low-cost sensors than the general inertial navigation. The Vehicular DR results can be used in any of the following ways:
   i. To provide measurement update for the device navigation solution (in addition to the calculation of the standard deviations for these updates)
   ii. Integrated with the device navigation solution in a Least Squares sense
   iii. Used as the only positioning and navigation solution from the device but for the vehicular platform having the platform heading fully resolved from the portable device heading (obtained from device gyroscope or magnetometer)
e. Where the platform is of vehicular type (i.e. vehicular mode of conveyance) and the misalignment is resolved, map data and street information can be used to constrain the navigation solution if such map data is available, and thus enhance the solution.

The algorithmic constraints (such as the examples mentioned above) that help enhancing the navigation solution need to benefit from the obtained misalignment information between the device and the platform (or equivalently from the attitude of both device and platform) and may benefit as well from the standard deviation of the obtained misalignment (or the standard deviations of the attitude of both device and platform).

It should be noted that the present method can be used in a variety of applications including those that comprise navigation solution including:
position, velocity and attitude or
only position and attitude,
or partial navigation solution including:
only attitude and velocity or
only attitude.

Embodiment 1

It is known that, during normal use, the attitude of a device (e.g. portable phone) changes freely. Indeed, such devices often undergo rotational movements along any of their major axes (e.g. the x-axis, y-axis and z-axis) when positioned, for example, for texting in either landscape or portrait view, when positioned on a belt, or near a user's ear during phone use. Such axes are defined in FIG. 1, wherein the forward axis of the device is defined as x-axis, the vertical or z-axis is pointing downward and the transversal axis or y-axis is defined in a way to complete the right handed coordinate system.

It is also known that the orientation of a device within a platform is not representative of the orientation of the platform. The device may undergo any number of rotational movements along any of its major axes, with respect to the platform. These rotational movements of the device do not indicate that the platform is going through the same changes in orientation. For example, the user or platform may be moving on a leveled 2D plane while the device may be undergoing any number of possible roll and pitch angles. FIG. 1 shows several possible relationships between an unconstrained device and different platforms.

Typical portable devices comprise accelerometers for measuring accelerations or specific forces, along each of the sensitive axis, i.e., the x-axis, y-axis and the z-axis. It is known that "roll" is defined as the rotation of the device along the forward x-axis, while "pitch" is the rotation along the lateral y-axis. Because the device user is free to rotate the device as desired, the device can have several changes in roll, pitch and heading with respect to the platform. FIG. 1 also shows the three dimensional (3D) misalignment that can occur between said device and the platform (e.g. a person (b) or a vehicle (c)).

In order to determine the orientation of the device and/or the platform, the roll and pitch of the device needs to be known with significant accuracy such that appropriate corrections can be applied to obtain the platform's orientation. As such, this Embodiment 1 of the present method for enhancing the navigation solution for a device and a platform, wherein the mobility of the device is constrained or unconstrained within the platform, provide the means for estimating the absolute pitch and roll of the device (which are parts of the attitude of the device) (#1 in FIG. 2). More specifically, the present method is capable of utilizing accelerometers information from the device to calculate and resolve the absolute instantaneous roll and pitch angles of the device (#11 in FIG. 3). Additionally, the present method can deal with the sensor information that may contain unwanted signals such as "high frequency noise" signals resulting from sudden disturbances (e.g. stepping/walking movement of the user), or instantaneous accelerations (e.g. movement of a Vehicle) and cannot normally be used to provide accurate roll and pitch of the device (#14 in FIG. 3).

Several trigonometric identities can be used to derive the absolute roll and pitch angles from device accelerometers. By way of example, equations 1 and 2 are provided for the roll and pitch calculations that can be used in leveling of device to the local level frame such as North, East and Down (NED) frame from the device frame defined in FIG. 1.

$$r = \operatorname{atan2}(-acc_y, -acc_z) \tag{1}$$

$$p = \operatorname{atan2}\left(acc_x, \left(\sqrt{acc_y^2 + acc_z^2}\right)\right) \tag{2}$$

Where $acc_x$, $acc_y$ and $acc_z$ are the instantaneous or averaged acceleration measured along x, y and z axes.

The unwanted signals or noise must be removed by means of filtering such as, for example, through the use of a low pass filter. Alternatively, a moving average method is implemented to reduce the noise on the calculated roll and pitch or on the accelerometers readings themselves before the calculation of roll and pitch. This averaging reduces noise and suppresses the dynamics, thus making the averaged accelerometer signals mainly measuring the gravity components and more suitable to calculate pitch and roll. In the present method, the data is first averaged and then the roll and pitch are computed using equations 1 and 2.

Figure 3:
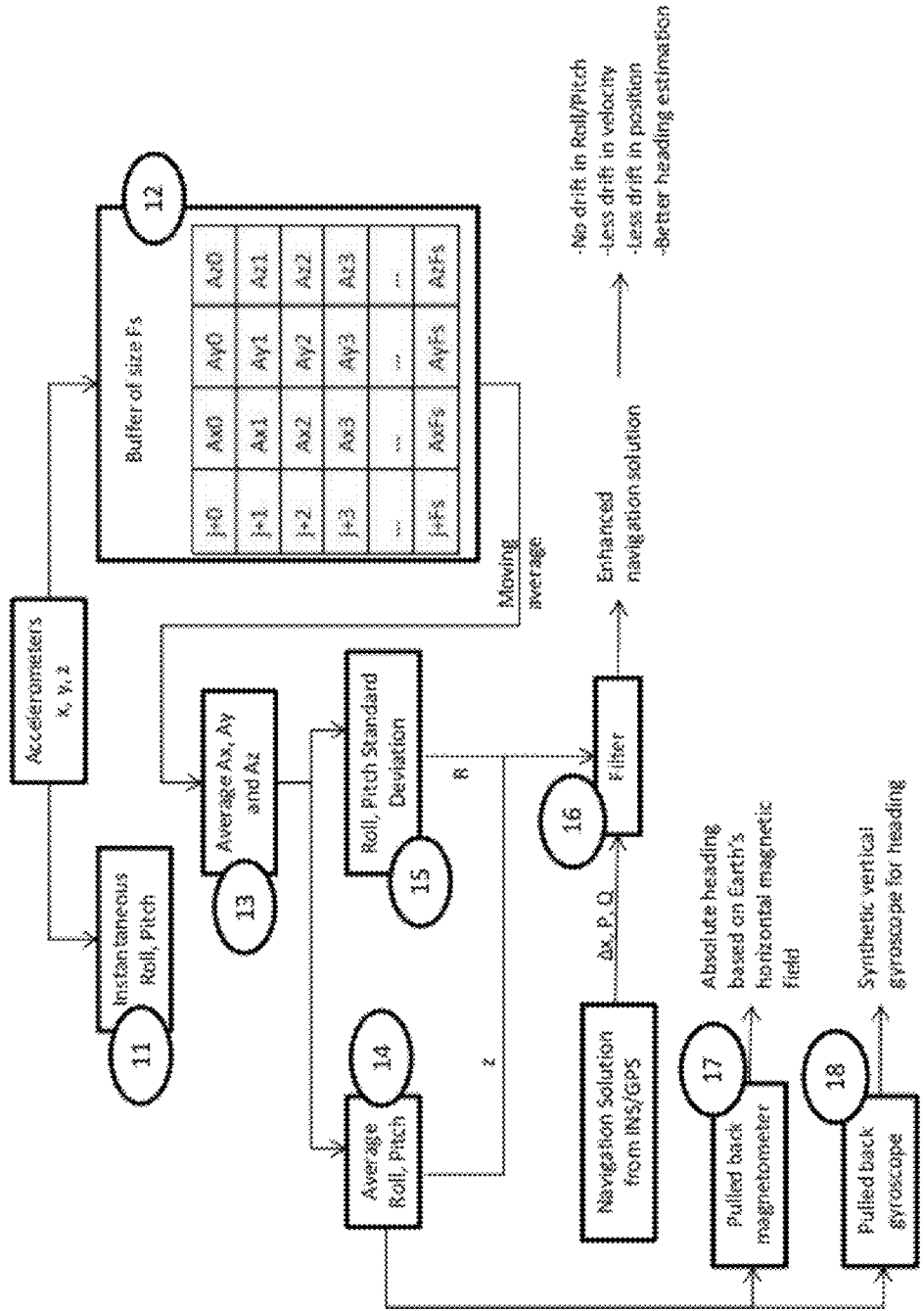
FIG. 3 shows an exemplary flowchart of Embodiment 1 of the present method.

Having regard to FIG. 3, where the platform is a person, a short window of accelerometer data (such as one second) may be kept and averaged for the calculation of roll and pitch, while longer window sizes may be kept for other activities such as driving (see #12, FIG. 3). The window size can be adjusted based on the high or low levels of activity to properly remove the acceleration of the platform before the roll and pitch estimation. Known mode detection modules, that discriminate between on-foot and in-vehicle information, can be used.

Once the roll and pitch are computed, the standard deviation of the two angles can then also be computed based on the accelerometer quality and the standard deviation of the data itself. The standard deviations of the roll and pitch (#15, FIG. 3) are computed by means of equation 3 and 4 as follows:

$$\sigma_r^2 = \left(\frac{acc_z}{acc_y^2 + acc_z^2}\right)^2 (\sigma_y^{avg})^2 + \left(\frac{acc_y}{acc_y^3 + acc_z^3}\right)^2 (\sigma_z^{avg})^2 \quad (3)$$

$$\sigma_p^2 = \frac{A}{B^2}(\sigma_x^{avg})^2 + \frac{(acc_x * acc_y)^2}{B^2 * A} * (\sigma_y^{avg})^2 + \frac{(acc_x * acc_z)^2}{B^2 * A}(\sigma_z^{avg})^2 \quad (4)$$

Where, $\sigma_x = \sqrt{BW} * VRW_x$ $\sigma_y = \sqrt{BW} * VRW_y$ $\sigma_z = \sqrt{BW} * VRW_z$ $A = acc_y^2 + acc_z^2$ $B = acc_x^2 + acc_y^2 + acc_z^2$ BW is the signal bandwidth and the VRW is the velocity random walk for the accelerometers for x, y and z axis is in general will be referred as accelerometer quality. The accelerometer quality can either be obtained from the accelerometer specification sheet which is provided by the accelerometer manufacturer or it can be experimentally determined using techniques such as for example Allan Variance method. The standard deviations ($\sigma_x$, $\sigma_y$, and $\sigma_z$) computed above are divided by the number of samples used in the averaging of data to get ($\sigma_x^{avg}$, $\sigma_y^{avg}$, $\sigma_z^{avg}$).

Optionally, a longer-term average of the square root of the sum of the squares of the acceleration readings can be computed when the platform is a vehicle and is static, or the platform is a person walking with constant device orientation. Such a value is a better representation of the readings without motion or dynamics, i.e. it consists of mainly the gravity and any residual uncompensated sensor biases. Furthermore, the shorter term average (for window sizes as discussed earlier) is also calculated for the square root of the sum of the squares of the acceleration or specific force readings. The difference between the longer average and the short term average is an indication of the presence of residual dynamics in the short-term average and thus can be used to further tune the standard, deviation of roll and pitch.

FIG. 3 also shows means for improving the navigation solution in the absence of other sources of absolute measurement updates. For instance, where absolute updates from sources such as GPS are available, estimation of the device roll and pitch is not critical to improve the navigation solution (as the orientation is implicitly updated with the GPS). However, where absolute updates are degraded or denied (e.g. during GPS signal outages), the roll and pitch of the device roll and pitch calculated from the averaged accelerometers are used as updates to constrain the velocity and position solution from diverging.

Having regard to FIG. 3, the roll and pitch from the present embodiment (#14) along with their standard deviations (#15) can be used as measurement updates in a filter (where the prediction for these quantities are based on gyroscopes) such as for example an extended Kalman Filter to improve the navigation solution. Optionally, a non-linear filter or any other state estimation technique can be implemented to update the navigation solution with the roll and pitch updates. This method can be used alone to improve the navigation solution or can be combined with other methods to further improve the navigation accuracies.

Depending on the state vector and the system model used by the state estimation or filtering technique the design matrix for the roll and pitch measurement updates can have different forms. By way of example, the following design matrix for the roll and pitch measurements is presented when the navigation is performed in NED frame:

$$H = \begin{bmatrix} 0_{1\times 6} & \frac{\partial r}{\partial \varepsilon^n} & \frac{\partial r}{\partial \varepsilon^e} & 0_{1\times 13} \\ 0_{1\times 6} & \frac{\partial p}{\partial \varepsilon^n} & \frac{\partial p}{\partial \varepsilon^e} & 0_{1\times 13} \end{bmatrix} \quad (5)$$

Where $\frac{\partial r}{\partial \varepsilon^n}$ = partial derivative of roll with respect to misalignment in north channel $\frac{\partial r}{\partial \varepsilon^e}$ = partial derivative of roll with respect to misalignment in east channel $\frac{\partial p}{\partial \varepsilon^n}$ = partial derivative of pitch with respect to misalignment in north channel $\frac{\partial p}{\partial \varepsilon^e}$ = partial derivative of pitch with respect to misalignment in east channel The computed roll and pitch can also be used to mathematically "pull back" other sensor readings that may be part of the device to a leveled horizontal plane. These sensors may include gyroscopes and magnetometers, and both of these sensors, if leveled, are used to calculate the heading, thus eliminating the need of specific orientation of the device by the user. The pulled back gyroscopes will be referred to as "leveled synthetic gyroscopes". For example, FIG. 3 shows that the roll and pitch, as calculated herein, can be used to pull back a gyroscope triad (#18) and a 3D magnetometer (#17) by multiplying the 3D readings of the respective sensors with the Direction cosines matrix composed of the computed roll and pitch values and a zero value for heading. This is a leveling operation to the local horizontal level, and the leveled readings are considered as those of a synthetic leveled gyroscope and a synthetic leveled magnetometer.

If the mode of transit is in-vehicle and the platform's (vehicle's) speed or velocity and consequently acceleration (derived from the velocity or the speed and turning rate) is known, the platform motion is decoupled from the accelerometer readings to get a better estimate of roll and pitch of the device.

Embodiment 2

It is known that absolute roll, pitch and heading are required for inertial navigation. Typically, absolute heading of a moving platform is estimated by taking the arctangent of east and north velocities from an absolute velocity source (such as a GNSS receiver). Where GNSS is unavailable (e.g. indoor environment), other known methods of calculating heading may be applied.

For instance, where a GNSS is unable to provide velocities of the moving platform, or the platform is not moving and the device has a calibrated magnetometer, the absolute device heading can be obtained using the two leveled horizontal components of the earth's magnetic field. Where a digital map is available, the absolute heading of the platform can be calculated from the map. The presence of a radio frequency positioning system other than GNSS can also be used estimate the heading based on the platform changes in position coordinates with respect to time provided that estimated positions are accurate and smooth enough to estimate heading.

Alternative methods are provided in this embodiment to calculate heading of the platform where wireless communication systems or wireless networks that enable measurement of received signal strength (RSS), such as for example a WiFi network, are available. The methods in this embodiment depend upon the rate of change of RSS measurements to reduce biasing effects and use a low pass filter on the RSS values to reduce noise.

As such, this Embodiment 2 presents a method (represented as #2 in FIG. 2) for enhancing the navigation solution for a device and a platform, wherein the mobility of the device is constrained or unconstrained within the platform, this method comprises detecting and estimating the absolute heading of the platform (which is part of the attitude of the platform) using signals received from wireless communication systems, where available. Wireless signals used in this embodiment may be obtained from wireless communication systems or wireless networks having an RSS value, such as for example WiFi signals. By way of definition, the beacons of any of these wireless systems are referred to herein as "Access Points" or "AP".

All instances of the present Embodiment 2 obtains the absolute heading of the platform from wireless signals by relying on the time rate of change of the RSS values, thereby alleviating any biasing effects in these measurements. Using rate of change of RSS makes the present method robust against hardware changes and absolute RSS variations, which commonly occur in harsh indoor environments. Because the RSS values are noisy, low pass filtering or any other de-noising technique can be applied first to these RSS values before using them to calculate the time rate of change. The output from all the instances of this embodiment is the heading of the platform along with its standard deviation or error range.

A first instance of the present Embodiment 3 provides utilizing RSS for the wireless signals and requires pre-knowledge of at least one first position coordinate along with the current distance traveled from the at least one first position coordinate. If the moving platform moved from a known location for at least a minimum distance D the present method can estimate the heading.

For example, where a MEMS-based navigation system is used indoors starting from a known navigation state, the short term accuracy of such system can maintain a reliable positioning solution for a short time. A heading update can help in maintaining good accuracy of the navigation solution for an extended period of time. The steps of the algorithm used to calculate the heading indoors if the needed wireless signals are available are described as follows:

1—Record the starting time $t_i$ after an available position update such as for example GNSS, WiFi or digital map.

2—Measure and record the RSS for all APs from time $t_i$.

3—Calculate the distance travelled since time $t_i$ and if the traveled distance fulfills the minimum distance D criterion, set the value of $t_c$ to the current time.

4—Apply a digital filter to the measured signals to remove the high frequency noise. Preferably, said digital filter may comprise an auto regressive model.

5—Conduct a search in a reference database that contains the locations of all wireless APs to determine the locations of each AP from which the RSS was measured in step 2.

6—Obtain or calculate the current location of the platform by using any available positioning solution or using the integrated navigation solution with the sensors onboard the device.

7—For each AP with known location:
   a. Calculate the rate of change of the RSS values recorded from time $t_i$ to time $t_c$ be for $\text{diff}(RSS_j)^k$ for the $j^{th}$ AP, wherein
   b. The platform is moving towards the $j^{th}$ AP if the mean of rate of) change of RSS values for this AP $\overline{\text{diff}(RSS_j)}$ is positive and above certain threshold. Thus, the heading must be in the range that satisfies the fact that the platform is moving towards that AP (see user 1 in FIG. 4). In this case, the AP angle is the angle of the line pointing from the current platform or user location to the AP location, or
   c. The platform is moving away from the $j^{th}$ AP if $\overline{\text{diff}(RSS_j)}$ is negative and below certain threshold. Thus, the heading must be in the range that causes the moving object to move away from that AP (see FIG. 4 user 2). In this case, the AP angle is the angle of the line pointing from the AP location to the current platform or user location.

8—Find the angles using steps 7-b and 7-c for all the available APs and perform a clustering step on the AP angles. Preferably, such clustering step may be done using a k-mean clustering technique.

Figure 4:
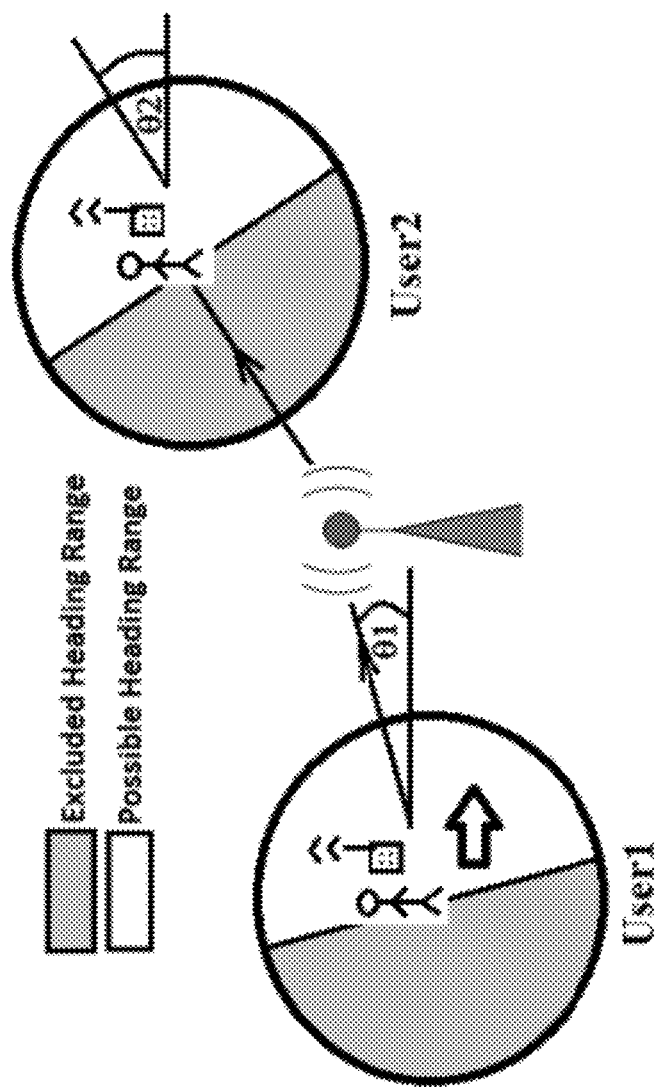
FIG. 4 shows an example (i.e. indoor environment) of a first instance of Embodiment 2 of the present method.
Figure 5:
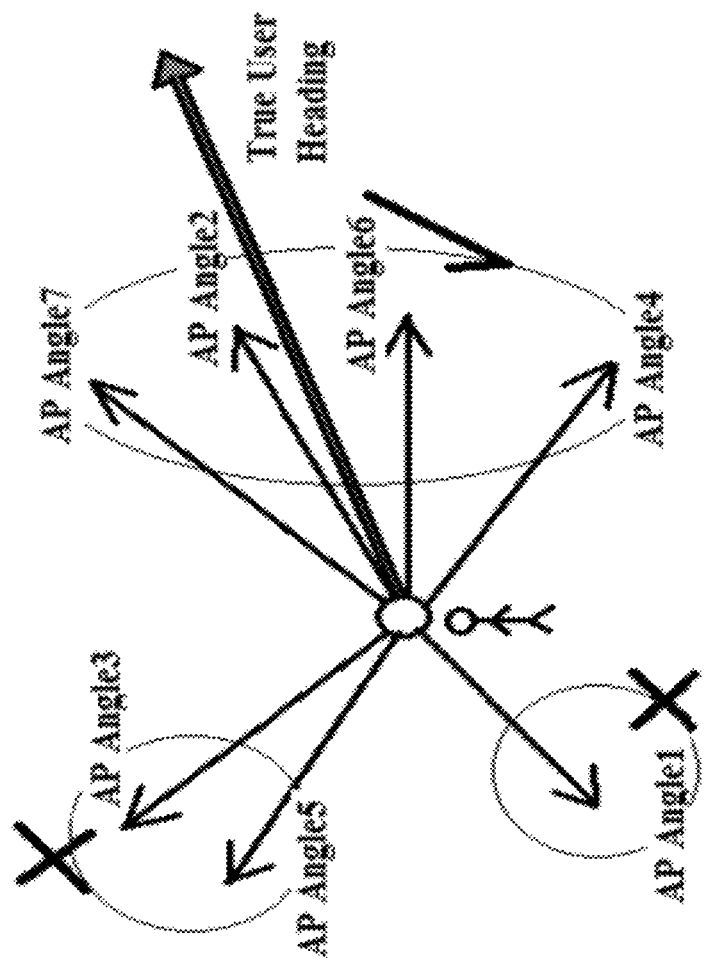
FIG. 5 shows an exemplary diagram of the clustering performed in the first instance of Embodiment 2 of FIG. 4.

9—From step 8, choose the angles that belong to the largest cluster as illustrated in FIG. 5 to filter out any outliers resulting from signal noise. For each chosen access point, a platform heading range estimated as shown in FIG. 4.

Figure 6:
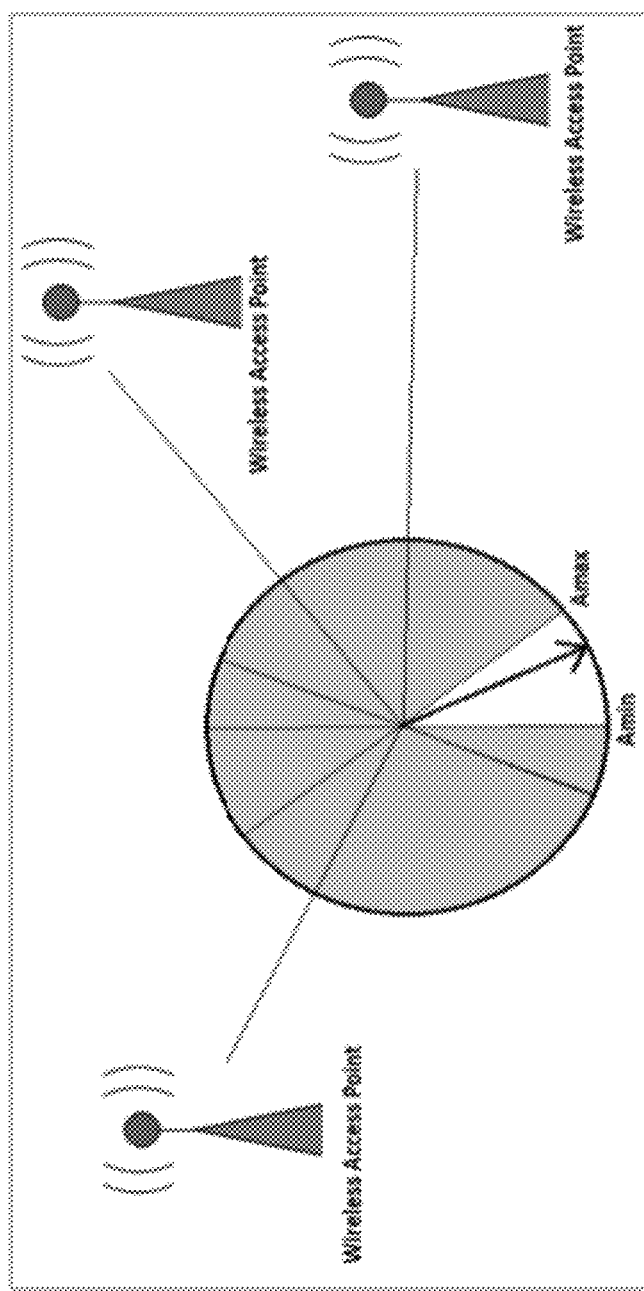
FIG. 6 shows an exemplary diagram of the intersecting of all estimated platform heading ranges and the maximum and minimum heading range performed in Embodiment 2 of FIGS. 4 and 5.

10—From the chosen AP platform heading ranges, calculate the platform heading range by intersecting all estimated platform ranges as shown in FIG. 6.

11—Set the maximum ($A_{max}$) and minimum ($A_{min}$) heading as the current heading estimation range as shown in FIG. 6.

12—If the true heading is actually the heading estimated for the $j^{th}$ AP's angle, then the mean of the rate of change of the RSS values of $AP_j$ will be larger than that of any other AP's angle. This is used to perform weighted average estimate of heading A* and accuracy measure $\sigma_A$ as follows:

$$A^* = \text{atan2}\left(\sum_{j=1}^{N} w_j \sin(A_j), \sum_{j=1}^{N} w_j \cos(A_j)\right) \quad (6)$$

$$\sigma_A = 0.5 \text{abs}(A_{max} - A_{min}) \quad (7)$$

where $A_{max}$ and $A_{min}$ are the boundaries of current heading range and $w_j$ is a weight given by $$w_j = \text{diff}(RSS_j)/\Sigma_{i=1}^{N} \text{diff}(RSS_i) \quad (8)$$

A second instance of Embodiment 2 of the present method utilizes measurement-based estimation techniques to further reduce the effect of noise. For instance, this instance of the present embodiment obtains the absolute heading of the moving platform from wireless signals by relying on the time rate of change of the RSS values as well, thereby alleviating any biasing effects in these measurements.

By way of example, the time rate of change of the RSS of the $i^{th}$ AP at time step k, will be called $$\left.\frac{dRSS_i}{dt}\right|_k.$$

This is calculated from the different RSS values from the different APs numerically by formulas that calculate discrete derivative, these numerical formulas can be of any order in time (i.e. with any memory length in the discrete domain) to calculate better and more smooth derivatives. Low pass filtering can be applied first to these RSS values before using them to calculate the derivative, as explained earlier; or alternatively any other de-noising techniques can be used.

The coordinates used here for demonstration are Cartesian and are referenced to a starting point within a local level frame, the coordinates then could be for example East, North, Up from an initial latitude, longitude, and altitude (this initial point is the origin of the Cartesian coordinate frame under consideration). Since usually in navigation systems latitude, longitude, and altitude are the position coordinates used in the majority of navigation systems, the conversion between this coordinate system and the local Cartesian system used here for demonstration is as follows:

$$\text{North}_k = (\varphi_k - \varphi_0) * (M + h_0)$$

$$\text{East}_k = (\lambda_k - \lambda_0) * (N + h_0) * \cos(\varphi_0) \quad (9)$$

where M is the Meridian radius of curvature of the Earth's ellipsoid and N is the normal radius of curvature of the Earth's ellipsoid. To simplify the terminology x, and y are interchangeably used with East, and North.

The platform or user coordinates at time step k will be referred to as $(x_k, y_k)$, this may be obtained by the integrated navigation solution that uses accelerometers, gyroscopes, and if available, magnetometers and barometer, together with absolute navigation information such as GNSS (which may be obstructed if indoor, but it already helped the solution and sensor-error estimation when it was available). The $i^{th}$ AP coordinates will be referred to as $(x_k^{AP_i}, y_k^{AP_i})$. As mentioned earlier, a possible way to obtain the access point coordinates is through a search in a reference database that contains the locations of all wireless access points to determine the locations of each access point from which the RSS was measured. The platform or user velocity at time step k will be referred to as $(v_{x,k}, v_{y,k})$.

Figure 7:
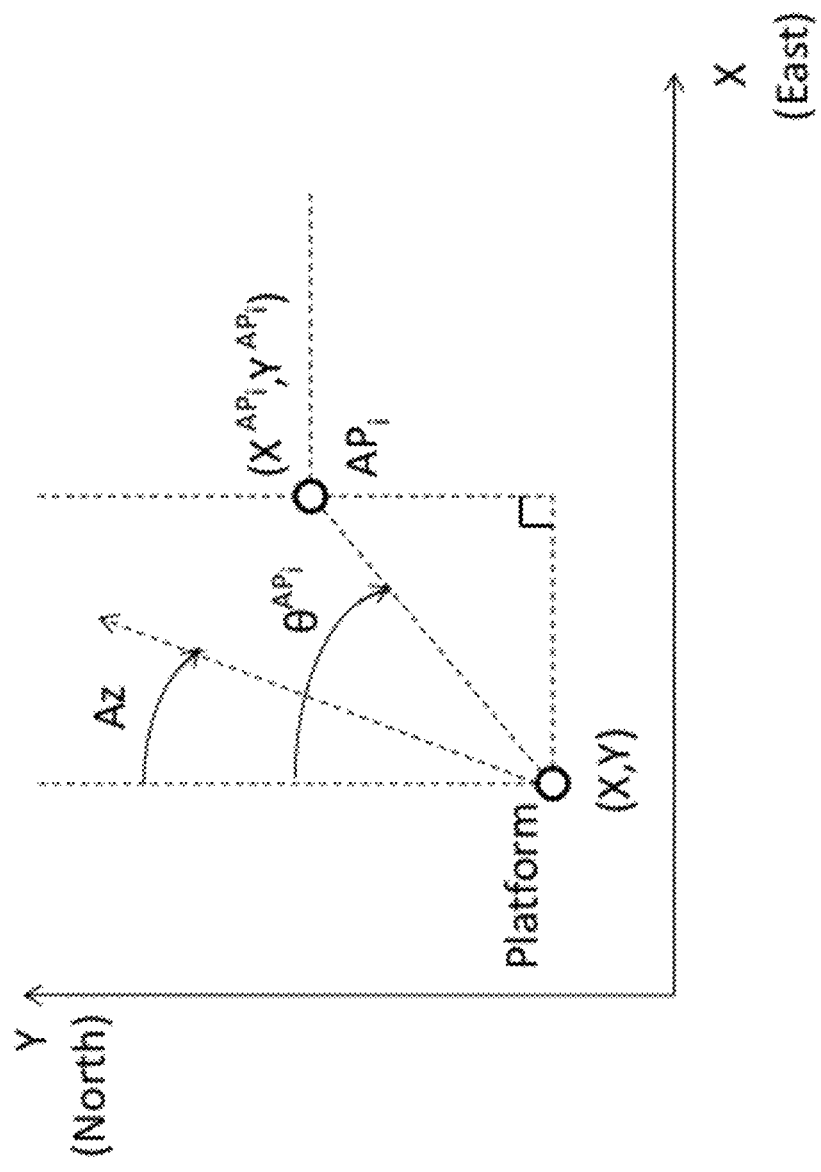
FIG. 7 shows an exemplary diagram of the geometry between the platform and an access point used in the second and third instances of Embodiment 2.

As per the geometry in FIG. 7, the time rate of change of the RSS of the $i^{th}$ AP at time step k is related to the coordinates and velocity as follows:

$$\left.\frac{dRSS_i}{dt}\right|_k = c\left(\frac{(x_k^{AP_i} - x_k)(v_{x,k}) + (y_k^{AP_i} - y_k)(v_{y,k})}{\left((x_k^{AP_i} - x_k)^2 + (y_k^{AP_i} - y_k)^2\right)^{\frac{1}{2}}}\right) \quad (10)$$

This relation is similar to the Doppler relation with velocity. The derivative of the RSS is proportional to the velocity projected on the line of sight between the AP and the moving platform. Since the RSS values have no global unit and vary from one system to another, equation 10 has a constant of proportionality term c.

Since, in general, several APs are visible to the platform or user (for example N APs are visible), then the time rate of change of the RSS of each of these APs is calculated, and a measurement-based estimation technique (which does not rely on a system model but rather on measurement only) is used to obtain the platform or user velocity as well as their standard deviations. Examples of such measurement-based estimation techniques to use are Maximum Likelihood-based techniques (that maximize the likelihood of the observation) or Least Squares-based techniques. The availability of measurements from several APs and the use of an estimation technique tackle and further decrease the effect of the noise in the measurements.

Having the platform or user velocity obtained along the East and North (the x and y directions), the platform heading can be obtained as $A_k^{platform} = \text{a tan } 2(v_{x,k}, v_{y,k})$. Furthermore the standard deviation of this calculated heading is obtained from the standard deviation of the velocity components. Such techniques can solve for the unknown c as well. It is to be noted that even if the constant of proportionality c is not estimated explicitly, the quantities $c^*v_{x,k}$ and $c^*v_{y,k}$ are the ones estimated rather than $v_{x,k}$ and $v_{y,k}$; thus the heading is still calculated as $A_k^{platform} = \text{a tan } 2(c^*v_{x,k}, c^*v_{y,k})$.

Another instance of the present embodiment of obtaining the absolute heading of the moving platform from wireless signals also relies on the time rate of change of the RSS values, thus alleviating any biasing effects in these measurements. The calculation of rate of change and the possible de-noising are achieved as described earlier.

As per the geometry in FIG. 7, the angle of arrival from the $i^{th}$ AP $\theta^{AP_i}$ is related to the position coordinates as follows:

$$\theta^{AP_i} = \text{atan2}(x_k^{AP_i} - x_k, y_k^{AP_i} - y_k) \quad (17)$$

Thus, $$\left.\frac{dRSS_i}{dt}\right|_k = c(\sin(\theta_k^{AP_i})(v_{x,k}) + \cos(\theta_k^{AP_i})(v_{y,k})) \quad (12)$$

Having the speed of the platform and the following relation, $$speed_k = ((v_{x,k})^2 + (v_{y,k})^2)^{\frac{1}{2}} \quad (13)$$

Then, $$\left.\frac{\frac{dRSS_i}{dt}\bigg|_k}{speed_k}\right. = c\left(\frac{\sin(\theta_k^{AP_i})(v_{x,k}) + \cos(\theta_k^{AP_i})(v_{y,k})}{((v_{x,k})^2 + (v_{y,k})^2)^{\frac{1}{2}}}\right) \quad (14)$$

$$= c(\sin(\theta_k^{AP_i})\sin(Az_k) + \cos(\theta_k^{AP_i})\cos(Az_k))$$

$$= c * \cos(\theta_k^{AP_i} - Az_k)$$

where $Az_k$ the platform heading or Azimuth at time step k, and the angle of arrival $\theta_k^{AP_i}$ of the $i^{th}$ AP at time step k is either calculated as in equation (17) or measured directly (if this measurement is available, i.e. if the antenna(s) for the wireless system at hand and receiver on the device allow for obtaining such measurement).

Two possible ways to proceed are as follows:
a) Using a measurement-based estimation technique, such as a Maximum Likelihood-based technique (that maximize the likelihood of the observation) or a Least Squares-based technique, and the measurements from the several visible APs, to obtain the platform heading and its standard deviation. Such techniques can solve for the unknown c as well.
b) In the case the constant of proportionality c is known, then for each visible AP, a possible platform heading is calculated using $$Az_k^j = \theta_k^{AP} - \cos^{-1}\left(\frac{\frac{dRSS_i}{dt}\big|_k}{c * speed_k}\right) \quad (15)$$

The platform heading can be calculated as a function of each of the above possible platform headings $Az_k = f(Az_k^j|_{i=1 to N'})$, such as for example an average or a weighted average (in case a quality assessment is available for each AP measurement). Furthermore, the standard deviation of the obtained platform heading is calculated numerically from the different possible platform headings.

Embodiment 3

As discussed, it is known that absolute roll, pitch and heading are required for inertial navigation. In some cases, heading of the device or platform may be determined through calculating and determining the initial heading misalignment between the device and the platform. Problems arise, for example, in gyroscope-based solutions where the initial heading of the device may be required in order to keep "track" of the device heading as it moves over time. This is because such solutions require an initial heading value for the device to start integrating the rotation rates of the device and to obtain the instantaneous heading of said device. As such, a technique for estimating the initial misalignment between the device and the platform is needed to finally calculate the initial device heading, where the initial device heading is not directly available but the initial platform heading is known.

Figure 2:
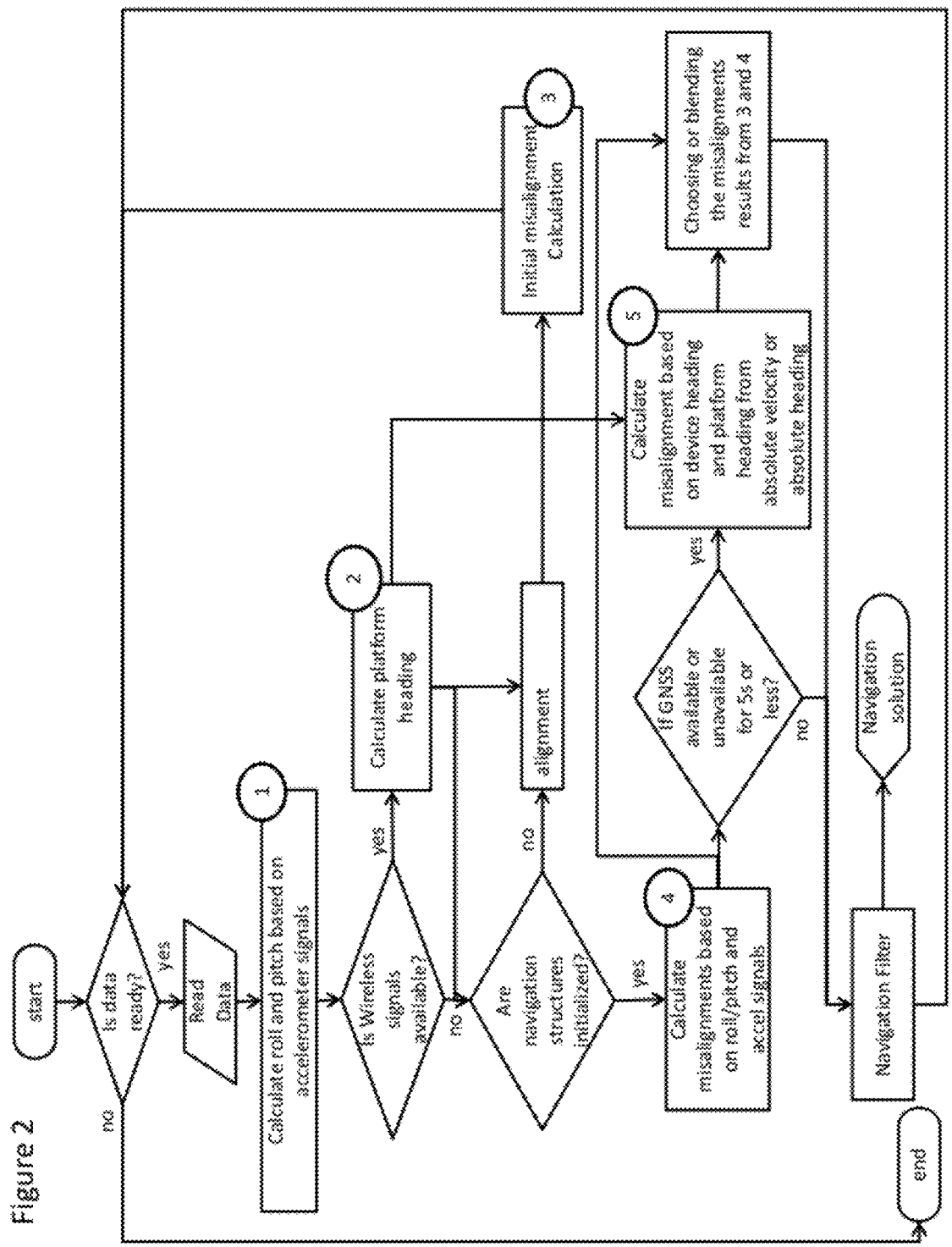
FIG. 2 provides a navigation flowchart representing the present method.

In light of the foregoing, the present Embodiment 3 provides a method for enhancing the navigation solution for a device and a platform, wherein the mobility of the device is constrained or unconstrained within the platform, by providing a technique for estimating the initial heading misalignment between the device and the platform (see #3 in FIG. 2). This technique may be used where an absolute source of velocity is available, and requires an initial heading of the platform from said source of absolute velocity, and that the source of absolute velocity be available for at least a 5 second period (with no constraints on the user motion during that period). One such source of velocity may be, for example, GNSS.

General Discussion of Different Heading Initialization Scenarios

Before describing the details of this Embodiment 3 of the present method, a description of different initialization scenarios is provided along with the possible ways to estimate the misalignments for some of those scenarios. After this description the method of Embodiment 3 will be presented to estimate the initial misalignment when absolute heading of the platform is available using the absolute velocities from the GNSS receiver present on the platform.

Figure 8:
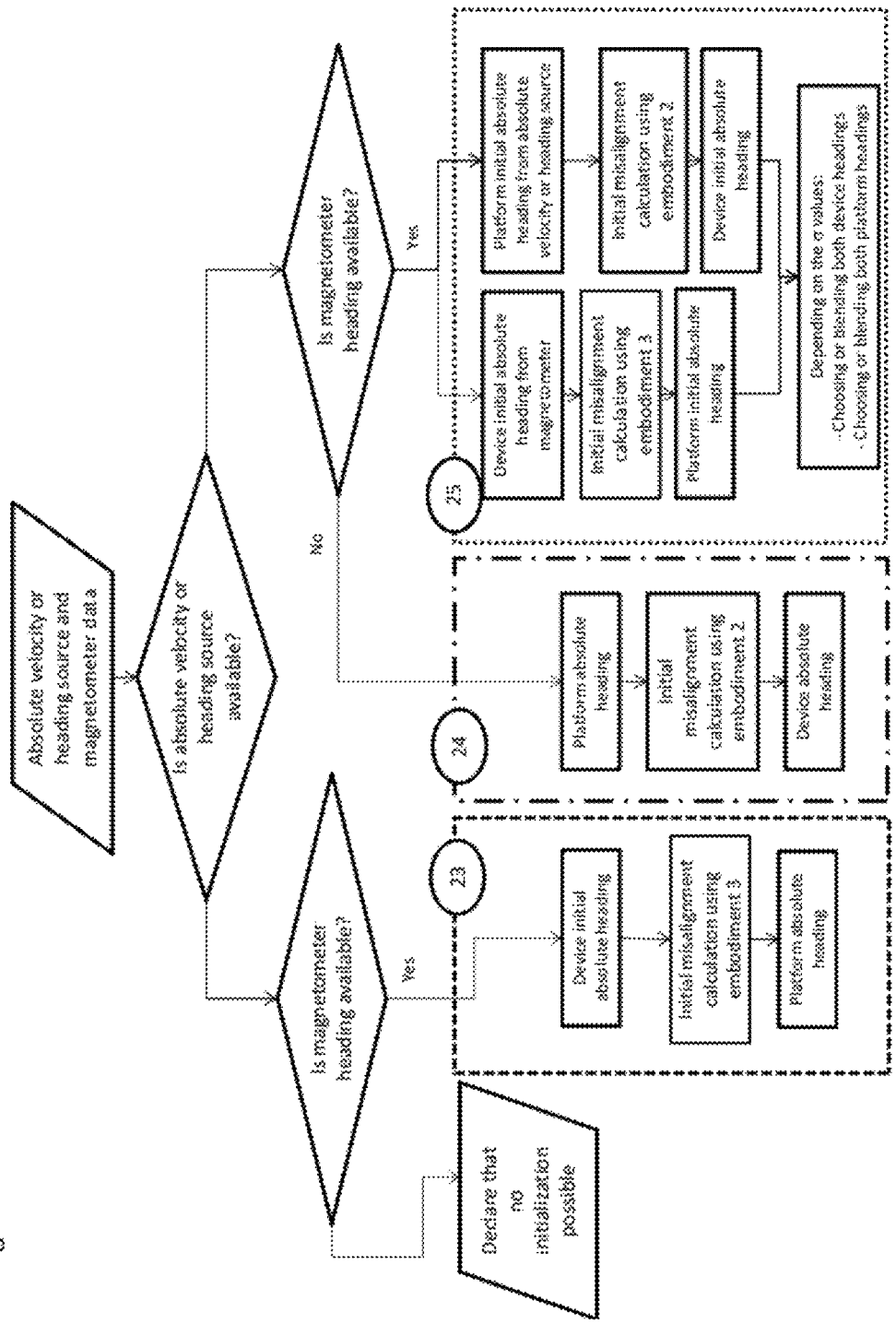
FIG. 8 shows an exemplary flowchart showing the Embodiment 3 and some usage of Embodiment 4 of the present method.

If an absolute velocity source such as from GNSS or GPS receiver is unavailable due to interruptions in the satellite signals but another absolute source of heading such as a magnetometer is available and with adequate readings, the magnetometer will be used to get the initial device heading (see #23 of FIG. 8). In another instance, if an absolute velocity source is available and if a magnetometer is not available or providing inadequate readings, the velocity source will be used to get the initial heading of the platform when it starts moving (see #24 in FIG. 8) as follows:

$$Az_k^{platform} = a\tan 2(v_k^e, v_k^n) \quad (16)$$

where k in general is the time index of the absolute velocity readings, and k=0 is the first reading. In yet another instance of the present Embodiment 3, if absolute velocity sources and a magnetometer are not available (or provides inaccurate readings), but wireless signals from a wireless communication system or a wireless network of any type, such as WiFi network, are available, then the initial heading of the platform as it starts moving can be obtained through wireless signals (if available) as described in Embodiment 2 above.

Generally, where the initial platform heading is available through an absolute velocity source or through wireless signals, the initial misalignment (if estimated) can be used to assist in obtaining the initial device heading (if not available from another source). Where the initial device heading is available through other means, such as, for example, through a magnetometer, the initial misalignment (if estimated) can be used to assist in obtaining the initial platform heading (if not available from another source).

Where magnetometer readings, and one or both of absolute velocity readings and wireless signals-derived platform heading are available, the absolute initial headings of the device and the moving platform can be obtained (see #25 in FIG. 8). If the headings stay constant within some error budget, a filtered solution can be used to further enhance the misalignment and device heading estimation. For example, the filtered solution can be a simple least squares solution. Any other positioning solution can also be used to find out the platform's heading by means of changes in the positions with respect to time.

Details of Initial Heading Misalignment as Per Embodiment 3

Having described the different initialization scenarios above, the details of this Embodiment 3 are now provided.

Where the initial heading of the moving platform is available, either via absolute velocity readings or another source, the initial heading misalignment of the device with respect to the platform $\Delta A_{initial}$ is calculated using the misalignment method of this Embodiment 3 (described herein). The initial device heading is obtained as $$A_{initial}^{device} = A_{initial}^{platform} + \Delta A_{initial} \quad (17)$$

The present method of this Embodiment 3 thereby requires that:
1) The heading of the platform can be tracked during a short period of time such as, for example, about 5 seconds. Preferably, this period of time is without any static period. If a static period is detected during the short period; the static period should not last for more than 1s in total. The tracking of platform heading can be obtained by either one of the following:
   i) the first heading of the platform can be obtained from the source of absolute velocity provided that the platform is not stationary or from another source such as for example as explained in Embodiment 2. The first heading may then be used for a gyroscope-based calculation of heading to keep track of the platform heading if the device misalignment with respect to the platform is kept near constant (might slightly change but does not undergo big changes); or
   ii) the absolute source of velocity during the short period during which this module will run. If during this period the platform stops temporarily the last heading is used for the temporary stop period.
2) The source of absolute velocity to be available for the same short period of time. This means that $v_k^n$, $v_k^e$, and $v_k^d$ are available during this short period, at whatever data rate this absolute source provides.

When the absolute velocity source is available, the first step of this misalignment method of Embodiment 3 is to use the absolute velocity measurement in the local level frame to generate acceleration in the NED local level frame $$a_k^n = \frac{v_k^n - v_{k-1}^n}{\Delta t} \quad (18)$$

$$a_k^e = \frac{v_k^e - v_{k-1}^e}{\Delta t} \quad (19)$$

$$a_k^d = \frac{v_k^d - v_{k-1}^d}{\Delta t} \quad (20)$$

where $\Delta t$ is the sampling rate of the absolute velocity source. The next step is to add gravity acceleration from a gravity model to get specific forces in the local level frame $$\begin{bmatrix} f_k^n \\ f_k^e \\ f_k^d \end{bmatrix} = \begin{bmatrix} a_k^n \\ a_k^e \\ a_k^d \end{bmatrix} + \begin{bmatrix} 0 \\ 0 \\ g \end{bmatrix} \quad (21)$$

where an example gravity model that can be used to calculate the acceleration of gravity is $$g = a_1(1 + a_2 \sin^2\varphi + a_3 \sin^4\varphi) + (a_4 + a_5 \sin^2\varphi)h + a_6(h)^2$$

where, the coefficients $a_1$ through $a_6$ for Geographic Reference System (GRS) 1980 are defined as: $a_1$=9.7803267714 m/s$^2$; $a_2$=0.0052790414; $a_3$=0.0000232718; $a_4$=−0.000003087691089 1/s$^2$; $a_5$=0.000000004397731 1/s$^2$; $a_6$=0.000000000000721 1/ms$^2$.

The next step is to use the pitch $p_k^{device}$ and roll $r_k^{device}$ together with different candidate values for the device heading (calculated from the platform heading corrected for different candidate heading misalignment values) to calculate the accelerations (more literally the specific forces) in the estimated candidate sensor frame (a candidate sensor frame is calculated from each candidate value of the device heading). Different heading misalignments are first chosen to cover all the 360 degrees ambiguity, for example, if the heading space is divided equally to 8 options, the following misalignments are the possible candidates to use $$\Delta A^{candidate} \text{ one from } \left[ -pi \quad \frac{-3pi}{4} \quad \frac{-pi}{2} \quad \frac{-pi}{4} \quad 0 \quad \frac{pi}{4} \quad \frac{pi}{2} \quad \frac{3pi}{4} \right] \quad (22)$$

$$A_k^{device} = A_k^{platform} + \Delta A^{candidate}$$

The rotation matrix from the device frame (i.e. the accelerometer frame) to the local level (NED) frame is as follows:

$$R_{device,k}^{\ell} = \begin{bmatrix} \cos A_k^{device} \cos p_k^{device} & -\sin A_k^{device} \cos r_k^{device} + \cos A_k^{device} \sin r_k^{device} \sin p_k^{device} & \sin A_k^{device} \sin r_k^{device} + \cos A_k^{device} \cos r_k^{device} \sin p_k^{device} \\ \sin A_k^{device} \cos p_k^{device} & \cos A_k^{device} \cos r_k^{device} + \sin A_k^{device} \sin r_k^{device} \sin p_k^{device} & -\cos A_k^{device} \sin r_k^{device} + \sin A_k^{device} \cos r_k^{device} \sin p_k^{device} \\ -\sin p_k^{device} & \sin r_k^{device} \cos p_k^{device} & \cos r_k^{device} \sin p_k^{device} \end{bmatrix} \quad (23)$$

This rotation matrix is then used to convert the NED frame specific forces into the candidate specific forces in the device frame as follows:

$$\begin{bmatrix} f_k^{x,candidate} \\ f_k^{y,candidate} \\ f_k^{z,candidate} \end{bmatrix} = (R_{device,k}^{\ell})^T \begin{bmatrix} f_k^n \\ f_k^e \\ f_k^d \end{bmatrix} \quad (24)$$

The actual accelerometers readings from the device are $[f_j^x \ f_j^y \ f_j^z]^T$ where j is the timing index for the higher rate inertial readings (preferably these accelerometers readings are used after removal of the estimated sensor errors). These actual sensors readings are down sampled to the relatively lower rate of the absolute velocity readings, for example, either by averaging or by dropping of the extra samples. The down sampled version of these actual accelerometers readings are compared to all the different candidate accelerometer readings (example of comparison techniques that can be used here are correlation techniques some of which can be bias independent, differencing or calculating root mean squared (RMS) errors). A best sector of possible heading misalignments is chosen and divided into further candidates of heading misalignment in this sector.

For example, if the best sector was from a misalignment of $$\frac{-3pi}{4}$$

to a misalignment of $$\frac{-pi}{4},$$

this range will be further divided into 8 new candidates as provided below:

$\Delta A^{candidate}$ one from $$\left[\frac{-3pi}{4} \quad \frac{-20pi}{28} \quad \frac{-19pi}{28} \quad \frac{-18pi}{28} \quad \frac{-17pi}{28} \quad \frac{-16pi}{28} \quad \frac{-15pi}{28} \quad \frac{pi}{2}\right]$$

Then the previously described operations are repeated. Different candidate accelerations (or more literally specific forces) in the estimated sensor frame are generated and again compared to the down sampled actual sensor readings. The operation continues either until the accuracy of the solution saturates and no longer improved or until a specific pre-chosen depth of comparison is achieved. An estimate of the misalignment between the heading of the device and the heading of the platform is obtained as the best $\Delta A^{candidate}$ together with an indication or measure of its accuracy from the depth of divisions the technique had undergone and the step separation of the last candidate pool for the misalignment. Thus, the initial device heading (that will be used to start the full navigation in this case) is computed from the platform heading and the estimated initial misalignment. The standard deviation of the initial device heading is also calculated.

Embodiment 4

The Embodiment 4 of the present method for enhancing the navigation solution for a device and a platform, wherein the mobility of the device is constrained or unconstrained within the platform, the method comprising estimating heading misalignment between the device and the platform, and consequently to provide means for estimating the absolute heading of the platform in the absence of any absolute heading or absolute velocity information for the platform. It is to be noted that the present method can be used as well even when the absolute heading or velocity information for the platform is available, and a better blended version of the heading misalignment and/or the absolute heading of the platform can be obtained.

The absolute heading of a device can be obtained using the sensors contained within the device, either by integration of the angular measurements starting from an absolute value or deriving the values directly from a sensor (such as a magnetometer). Platform heading can be calculated, even in absence of absolute heading updates or absolute velocity readings for the platform, if the misalignment with respect to the device is known. For example, if a person is navigating with a mobile phone, the phone will be in front of the person so that the person can view the current location. In such phone-in-hand cases, there are a number of possibilities for the misalignment between the person and phone, namely, when the phone is in portrait mode with a misalignment of 0 degrees, when the phone is in landscape mode with an absolute misalignment of 90 degrees (depending on the rotation of the phone clockwise or counterclockwise from the portrait mode, the misalignment will be either +90 or −90 degrees). These possibilities are the most common types of misalignment, and such misalignment can be estimated based upon readings from accelerometers within the phone (or a time average version of), or the roll and pitch angles derived therefrom. Table 1 provides the condition for some misalignment angles for a mobile phone. This method can provide a solution for the misalignment whether it is the initial misalignment or the continued instantaneous misalignment at any time epoch.

Other possible types of misalignment arise when the person is talking on the phone, or has the phone positioned on their belt. In these cases, misalignment can also be determined based upon accelerometer signals or the roll and pitch values derived from the accelerometer.

Alternatively, misalignment may be calculated, again even in absence of absolute heading updates or absolute velocity readings for the platform, using classification of device use cases such as, for example, when the device is on belt, in a pocket, on an ear, in texting portrait mode, in texting landscape mode, in compass mode, in backpack etc. In addition to the latter, other sensors can be used, such as proximity sensors (e.g. Infra-red, sonar etc) and transceivers that can get Doppler shifts and thus derive velocities or detections of answering calls with speaker phone off and headphones unplugged to further help the misalignment calculation and/or the classification of device use cases.

Averaged accelerometer signals can also be used in a similar format to estimate the misalignment. These averaged signals are also useful when the roll and pitch are not within the range of Table 1.

Alternatively, mathematical relationships including mean, mean energy, spectral density, circular convolution, and principle component analysis can be used to detect the forward axis of the device based on the assumption that for walking case, the forward acceleration of the moving body will be part of the sinusoidal stepping motion of the measured acceleration or specific force. All of these methods were used after removing the gravity components or after doing leveling through the pitch and roll of the device calculated as described in Embodiment 1.

Where the initial platform heading is not known, but there is a requirement to resolve the initial misalignment between the device and the platform, it is assumed that a magnetometer is present in the device. The magnetometer will provide the absolute heading for the device and using the estimated misalignment angles, the absolute heading of the platform can be estimated. The magnetometer is not essential when the method is implemented with known initial absolute heading for either mobile phone or the platform.

Embodiment 5

This Embodiment 5 of the present method comprises enhancing the navigation solution for a device and a platform, wherein the mobility of the device is constrained or unconstrained within the platform, the method comprising estimating the continued heading misalignment between the device and the platform using a source of absolute velocity of the platform, where said source of absolute velocity may be available or interrupted. Generally, the present Embodiment 5 may be used to determine the heading misalignment between the device and the platform using velocity-derived heading or absolute heading (for the platform) and sensor-derived heading (for the device).

By way of background, there are three possible sensor derived headings that can be used in device heading estimation. The first sensor-derived device heading comes from aided or unaided mechanization solution if it is available (this method for getting heading needs the initial misalignment to be resolved first using either Embodiment 3 or 4 above). The second sensor-derived device heading is computed by integrating the angular rate from a leveled synthetic gyroscope (can be obtained as discussed in Embodiment 1) (this method for getting heading needs the initial misalignment to be resolved first using either Embodiment 3 or 4 above). If a magnetometer is present, the sensor-derived device heading can be obtained using the magnetometer, after leveling the magnetometer triad (this method for getting heading does not need the initial misalignment to be resolved first). The device heading obtained by any of the methods is then compared with the arctangent or velocity-derived heading of the moving platform in case of GNSS or any other absolute heading of the platform for the misalignment estimation. Alternatively, mechanization or leveled synthetic gyroscope derived heading (whichever is available) and magnetometer-derived heading (if available) can be merged together to get a more smoothed heading for the device and thus a more smoothed heading misalignment solution can be achieved.

This Embodiment 5 provides means for calculating continued misalignment when absolute heading information is available, such as for example from the source of absolute velocity readings like GNSS or from wireless signals as presented in Embodiment 2. Preferably, the absolute heading information is required to get the moving platform heading on a continuous basis. However, this module can be implemented for short interruptions of these absolute updates or absolute heading. The first step is to determine the absolute continuous heading of the device by using any one of the following means or any combinations thereof:

1. Pitch and roll (from embodiment 1) aided inertial mechanization
2. Full aided inertial mechanization (i.e. the integrated navigation solution on the device)
3. Leveled synthetic gyroscope reading
4. Leveled magnetometer absolute heading
5. Any of the previous heading from steps 1 to 3 blended with the magnetometer results if available and adequate.

In all the above cases the standard deviation of the device heading (a measure of its certainty or the confidence in this heading) is also obtained.

Preferably, the absolute heading for the platform is obtained using equation 16: (i) if the absolute velocity is available, or (ii) by means of predicted velocity values using the state estimation technique or the Filtering technique during short absolute velocity interruption or degradation, or (iii) by means of the filtered velocity values using the state estimation technique or the filtering technique when the absolute velocity source is available. Alternatively, the platform heading may be obtained using wireless signals, such as described in embodiment 2. In another embodiment, if a digital map is available such as for example, indoor maps or street maps, the heading of the platform such as a person, vehicle or any other platform can be estimated from the map, and consequently the heading misalignment can be estimated. In another embodiment if the digital maps are unavailable but another radio frequency based positioning solution is available, the absolute heading of the platform can be estimated from the available positioning solution, and consequently the heading misalignment can be estimated. In all the above case, the standard deviation of the platform heading (a measure of its certainty or the confidence in this heading) is also obtained.

Using equation 22, the misalignment between the portable navigation-capable device and the platform can be obtained on continuous basis independent of the absolute heading or the absolute velocity source being interrupted or degraded for short periods of time. Furthermore, the standard deviation of this calculated misalignment value is calculated as the square root of the sum of the squares of the standard deviations of the device heading and the platform heading.

Embodiment 6

In this Embodiment 6, the present method provides means for enhancing a navigation solution for a device and a platform, wherein the mobility of the device is constrained or unconstrained within the platform, and wherein the device may be connected to the platform via a wired or wireless connection. As such, the device is capable of receiving navigational information from the platform.

A summary of the different scenarios covered by this embodiment is first given, then the details of each scenario follows. Where a device is capable of receiving speed, heading and/or turning rate information from a platform, the device can calculate a navigation solution for the platform or the device can calculate a misalignment between itself and the platform or it can provide combination of the two forms of information, i.e., a navigation solution and misalignment. If the platform has a navigation system and is providing navigational information to the device, the device can compute the misalignment by using the platform-provided heading or platform heading computed from the platform velocity and the device's heading. Where the navigational information is the speed of the platform, the information can be converted into accelerations and compared with the measured accelerations of the device to obtain the heading misalignment. Where the device receives speed information from the platform, and the heading misalignment is resolved between the platform and the device by any method except the last one above, the speed information can be used to obtain the roll and pitch angles of the device. These roll and pitch can be used to either perform an update of the navigation filter of the device or pull back the gyroscopes and/or magnetometer in a leveled horizontal plane. Additionally, a velocity update can also be performed to improve the navigation solution using speed and misalignment information. Where the device receives sensor information from the platform, the misalignment can be resolved on a continuous basis by comparing the angle measurements from the platform and the device gyroscopes (for example). In this case, at least the first absolute heading for the platform and the device should be available (or one of them obtained through the other by implementing the initial misalignment calculation from one of the previous parts of the invention).

On a first instance of this embodiment, if the device is wired or wirelessly connected to a platform such as for example a vehicle and the device is receiving information from the platform such as speed of the platform from, for example, the vehicle's odometer, and the heading or turning rate of the platform from gyroscope, magnetometer, steering rate sensors, or individual wheel speed sensors present in the platform, the device can:

a. calculate the platform's positioning/navigation solution (including platform heading) even if the absolute position or velocity source is interrupted such as for example GNSS outages and/or degraded performance even for long periods.

b. use the calculated heading of the platform (in step a. above) together with the heading of the device (obtained from the sensors and the navigation solution on the device) to calculate heading misalignment of the device with respect to the platform.

On a second instance, if the platform comprises a positioning system (such as a pre-installed system) capable of calculating position, Velocity and orientation of the platform or a subset thereof and the device is receiving this position, velocity and orientation of the platform or a subset thereof wired or wirelessly, the device can use the heading of the platform provided from the received orientation of the platform or derived from the received velocity of the platform together with the heading of the device to calculate heading misalignment of the device with respect to the platform.

On another instance of this embodiment, if the device is receiving speed or velocity of the platform wired or wirelessly and the misalignment of the device with respect to the platform is not resolved, the forward and normal accelerations of the platform can be derived from this relative speed or velocity of the platform. One possible way to obtain these accelerations is as follows: the forward acceleration of the platform is the time derivative of the forward speed of the platform, the normal or lateral acceleration is the negative of the product of the forward speed and the counterclockwise turning rate of the vehicle which can be obtained either from a gyroscope or from individual wheel speeds. These synthetic accelerations are transformed to specific forces by adding the acceleration of gravity and are then compared with the measured specific forces to calculate the misalignment between the device and the platform as described in the following. The pitch and roll of the platform are used to transform the synthetic accelerations to the local level frame; for platforms such as land vehicle the pitch and roll values are near zeros and this step may be skipped. Then the gravity acceleration from a gravity model is added to the vertical channel to get specific forces in the local level frame. The pitch and roll of the device together with different candidate heading misalignments, such as described in embodiment 3, are then used to transform the synthetic specific forces to the device frame (or sensor frame). These candidate synthetic specific forces are compared to the measured specific forces by the accelerometers (or to a downsampled or averaged version of these latter to have the same rate as the former). The comparisons can be achieved by means of mathematical operations such as but not limited to cross correlation or differencing of the two accelerations. The technique is achieved and stopped in a similar manner to the technique explained in embodiment 3.

On another instance, if the device is receiving relative speed or velocity of the platform wired or wirelessly and the misalignment of the device with respect to the platform is resolved by a method different than the one described in the previous paragraph, the relative speed or velocity of the platform can be used to obtain the device pitch and roll as described in the following. This happens by calculating the forward and normal accelerations of the device such as described above. The pitch and roll of the platform are used to transform the synthetic accelerations to the local level frame; for platforms such as land vehicle the pitch and roll values are near zeros and this step may be skipped. Then the gravity acceleration from a gravity model is added to the vertical channel to get specific forces in the local level frame. Different candidate pitch and roll of the device are calculated to cover the ranges of these unknown angles in a manner similar to what was described in embodiment 3 for the candidate heading misalignments. The candidate pitch and roll of the device, and the resolved heading misalignment between the device and platform are used to transform these specific forces to the device frame. These specific forces in the device frame are compared to the device accelerometers' measured specific forces (or from a downsampled or averaged version of these latter to have the same rate as the former). The comparisons can be achieved by means of mathematical operations such as but not limited to cross correlation or differencing of the two accelerations. The technique is achieved and stopped in a similar manner to the technique explained in embodiment 3. The obtained pitch and roll are then used for either:

a) Measurement update for roll and pitch predicted from angular rate measurement means such as gyroscopes in the device and to calculate the standard deviations for the roll and pitch.

b) Pull back 3D angular rate measurements such as from gyroscopes and the possible 3D magnetic field measurements from magnetometer (if available) to get a leveled synthetic gyroscope and magnetometer readings in a local level frame, respectively.

The algorithm of the foregoing instance is also applicable, even if there is no connection between the device and the platform for the device to receive speed of the platform wired or wirelessly, in circumstances where another source of speed or velocity is available to the device, such as for example the source of absolute velocity information (for example GNSS). Further, the algorithm of the foregoing instance can be applied using such speed or velocity readings to calculate the forward and normal accelerations of the device and then the technique continues as described above.

Additionally in any of the above instances or without the above instances, if the device is receiving relative speed or velocity of the platform wired or wirelessly and the misalignment of the device with respect to the platform is resolved, the relative speed or velocity of the platform can be used to generate and/or perform velocity update for the navigation solution of the device, this will be especially helpful when the absolute velocity readings are inadequate or interrupted.

On another instance of this embodiment, if the device is in a scenario where the platform has sensors and means to transfer the sensors information wired or wirelessly to the device, such as for example: (i) the device is handheld and the person has amounting belt clip containing the other sensors or a holder/mount in a backpack or purse containing the other sensors, or (ii) the device is within a vehicle containing the other sensors fixed somewhere such as in the dash or in a holder. The device can use the readings of these sensors mounted in the platform to calculate the misalignment between the device and the platform and/or to calculate a navigation solution for the platform on a continuous basis starting from initial absolute headings for the platform and the device (or one of them obtained through the other by implementing the initial misalignment calculation from one of the previous embodiments). This method can be used in the absence of absolute heading or velocity measurements after the initialization of the system is achieved.

Figure 9:
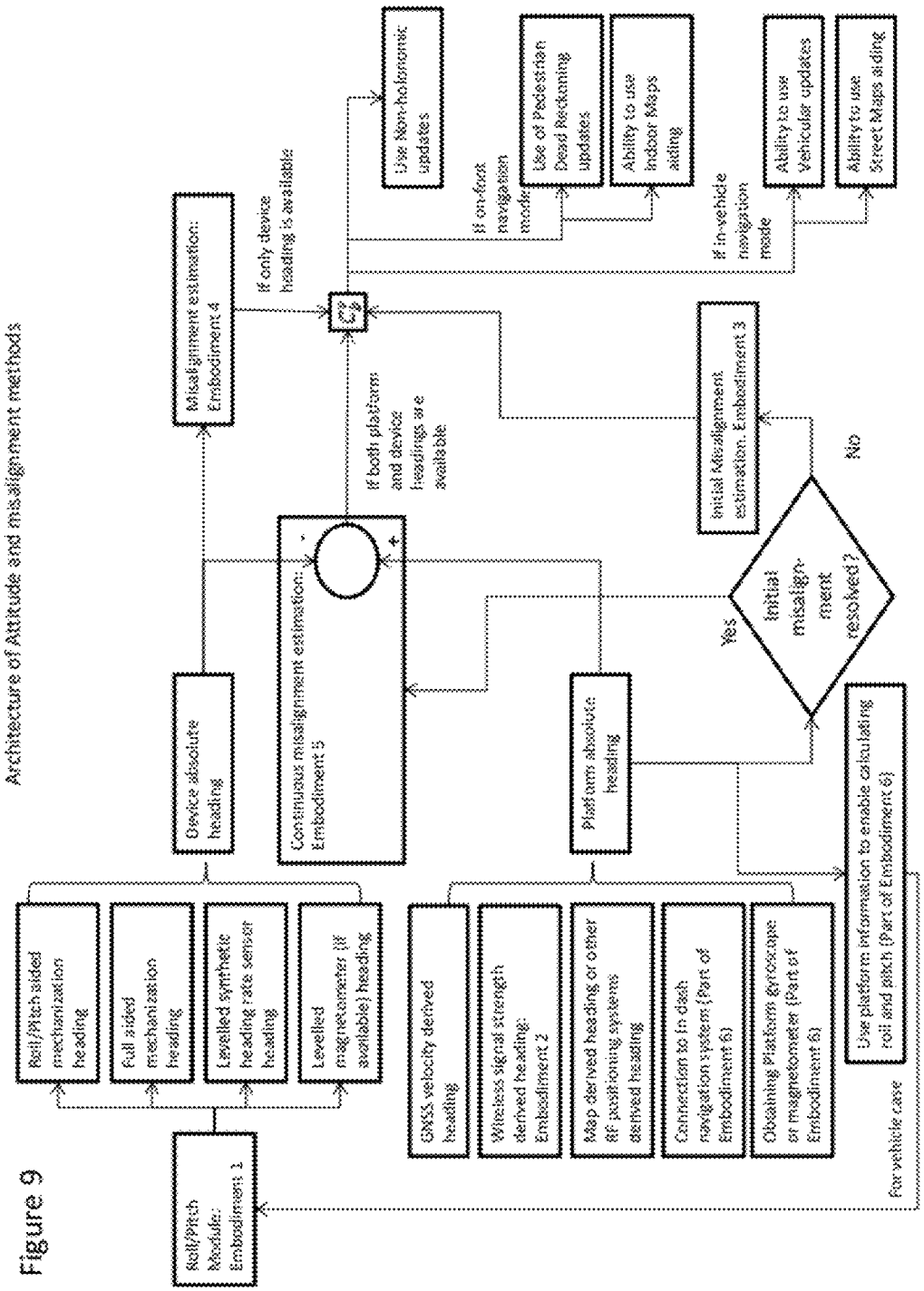
FIG. 9 shows an exemplary flowchart for the application of the present method.

It should be noted that the present disclosure defines a number of different embodiments of the present method of calculating the attitude and misalignment, however, these embodiments, either alone, together or in any combination thereof, provide means to improve the navigation solution for devices whose mobility is constrained or unconstrained within a platform. The present method with the different embodiments along with their possible interactions and how they can benefit the overall navigation solution is presented in the architecture provided in FIG. 9.

The embodiments presented herein may be combined with any navigation solution independent of the type of the state estimation or filtering technique defined herein. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

As mentioned earlier, the embodiments of the present method can be combined with a mode of conveyance algorithm or a mode detection algorithm to establish the mode of conveyance.

Contemplated Variants

The present disclosure describes the body frame to be x forward, y positive towards right side of the body and z axis positive downwards. It is contemplated that any body-frame definition can be used for the application of misalignment modules described here in.

It is contemplated that other sensors or detections means can be used for helping the misalignment calculation, such as for example: (i) proximity sensors including Infra-red, sonar, etc., (ii) transceivers that can get Doppler shifts and thus derive velocities, or (iii) detections of answering calls with speaker phone off and headphones unplugged.

It is contemplated that if the device is in a scenario with no absolute velocity update and no absolute heading update available (because of interruption, inadequacy, degradation, or absence) and environment maps of any type are available, they can be used to estimate the heading misalignment between the device and the platform.

It is contemplated that the embodiments presented above can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module.

It is further contemplated that the embodiments presented above can also be used together with modeling (whether with linear or nonlinear, short memory length or long memory length) and/or calibration for the other sensors in the sensor assembly (such as, for example the barometer and magnetometer). It is also contemplated that modeling (whether with linear or nonlinear, short memory length or long memory length) and/or calibration for the errors in the optional speed or velocity readings can be used.

It is further contemplated that the embodiments presented above can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the embodiments presented above can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the embodiments presented above can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based paseudorange and carrier-phase measurements, such enhancement is the carrier-smoothed pseudorange.

It is further contemplated that the embodiments presented above can also be used with a navigation solution that relies on an ultra-tight integration scheme between GNSS receiver and the other sensors' readings.

It is further contemplated that the embodiments presented above can also be used with a navigation solution that uses various wireless communication systems that can also be used for positioning and navigation either as an additional aid (will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may utilize the methodology described herein, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the embodiments presented above can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the embodiments presented above can also be used with various types of inertial sensors, other than MEMS based sensors described herein by way of example.

Without any limitation to the foregoing, the embodiments presented above are further demonstrated by way of the following examples.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

EXAMPLE

A low-cost prototype unit (for the portable device) consisting of a tri-axial gyroscopes from Invensense (ITG-3200), tri-axial accelerometer from Bosch (BMA150), tri-axial magnetometers from Honeywell (HMC5883L), barometer from Measurement Specialties (MS5803), a WiFi module from Redpine Signals (RS9110-N-11-28), and a GPS receiver from u-blox (LEA-5T) was used to log data for several trajectories whether in walking, driving or walking and driving. During these trajectories, the user carried the portable device in the following ways: handheld portrait mode, handheld landscape mode, talking (on the ear) and belt.

Figure 10:
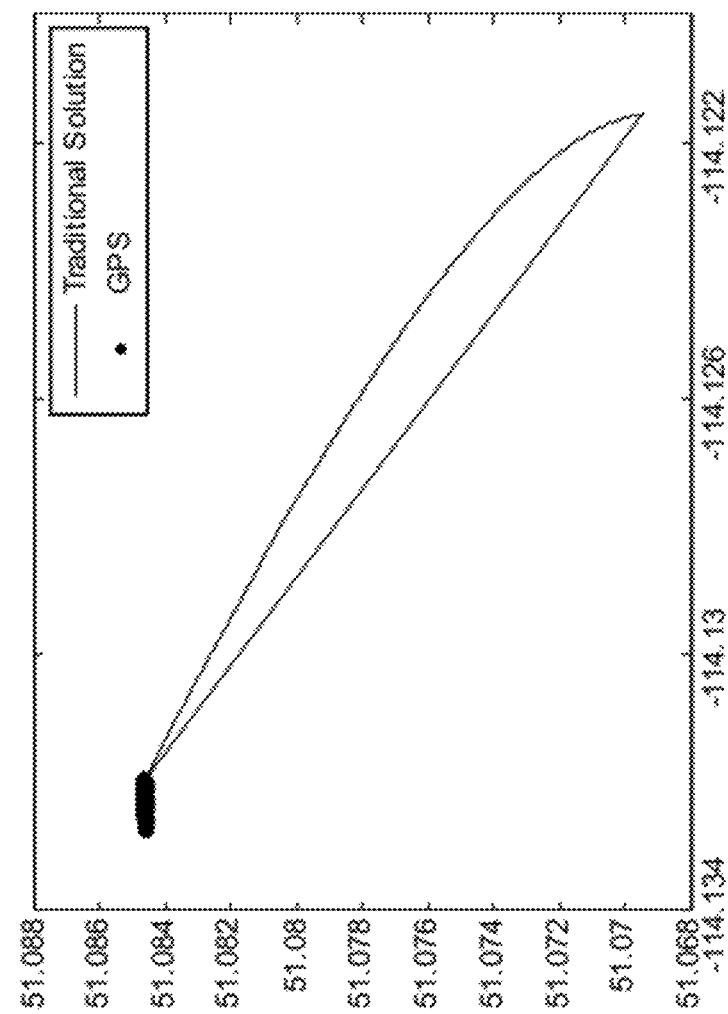
FIG. 10 shows an exemplary trajectory for a traditional navigation solution without GPS aid (GPS is for initialization only)
Figure 11:
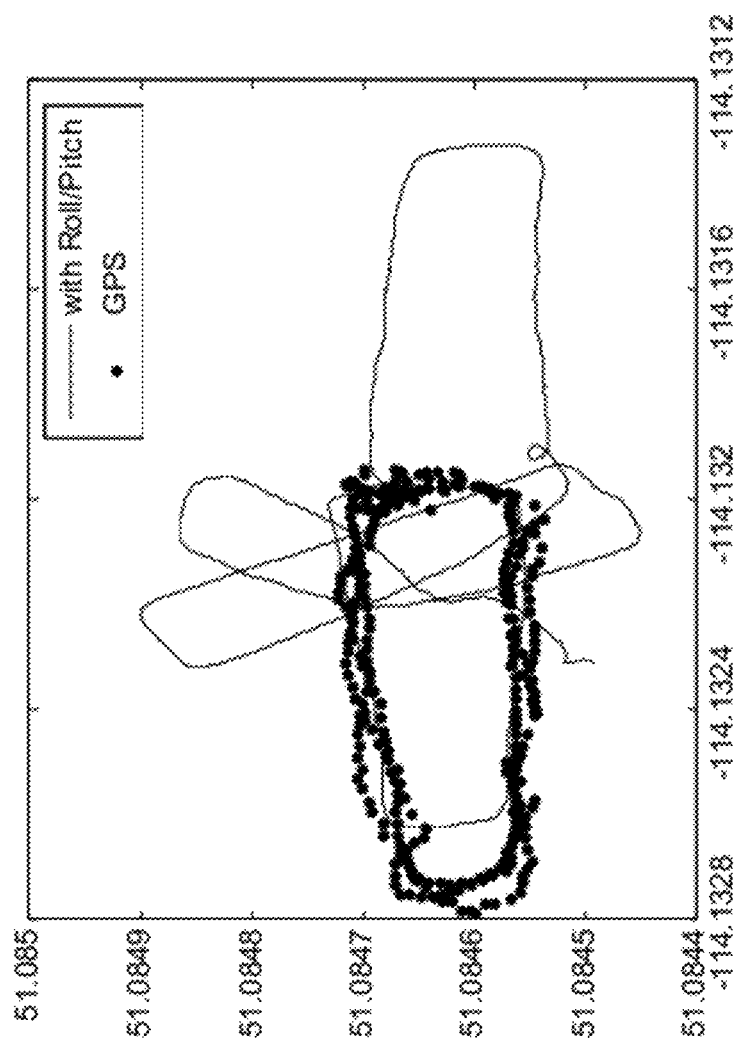
FIG. 11 shows an exemplary trajectory without GPS but with roll and pitch aid from Embodiment 1 of the present method (GPS is used for initialization only). GPS-only positions are provided for comparisons.
Figure 12:
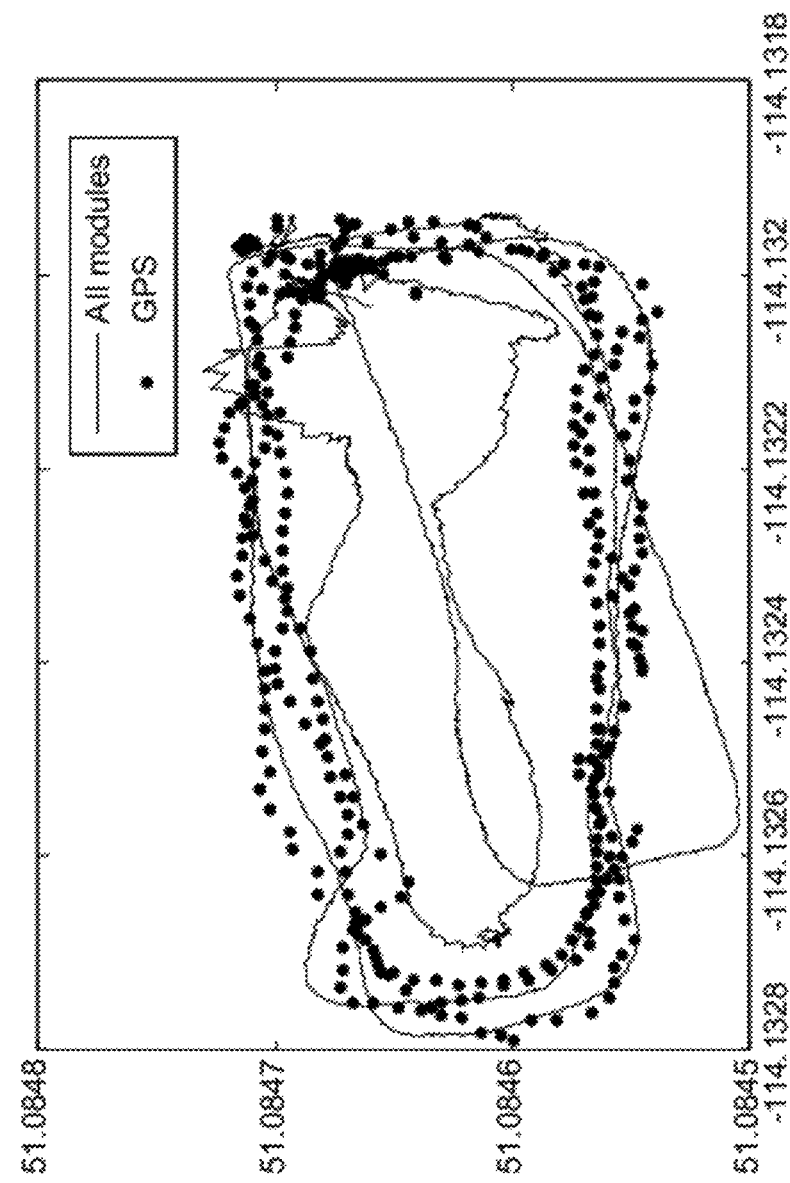
FIG. 12 shows an exemplary trajectory following estimation of misalignments using all the attitude and misalignment modules from Embodiments 1, 3 and 4 of the present method. The navigation results shown are after the corrections for misalignments. GPS was used for the initialization phase only.

FIGS. 10 to 12 show samples. results of using the above modules in a pedestrian walking case. In this trajectory, the GPS was used only during the initialization of the navigation solution and then no information from GPS including both the position and velocity was used afterwards to aid the navigation solution. The presented results are for more than 8 minutes without GPS (i.e. with GPS removed a discussed above) and the distance covered is more than 750 meters.

The results provided in FIG. 10 contains an unaided traditional navigation solution without GPS updates beyond initialization. While FIG. 11 also shows the solution (as a solid line) without GPS updates beyond the initialization phase, but methods described in embodiment 1 were used as follows:

a) Roll and pitch were calculated from the accelerations measured at the device
b) Roll and pitch standard deviations were estimated based on the sensor specifications found in Bosch specification sheets.
c) The unaided navigation solution was updated in a 21 states extended Kalman Filter.

It should be noted that the positioning solution enhanced significantly after only implementing the modules provided in embodiment 1. The only problem is the heading misalignment between the device and platform. The GPS position for the trajectory are provided to show the actual trajectory as a reference, which clarifies the influence of misalignment between device and platform and not knowing it. FIG. 12 shows the solution (as a solid line) that is the result when the misalignment modules of embodiments 3 and 4 of the present method were applied in addition to embodiment 1.

Figure 13:
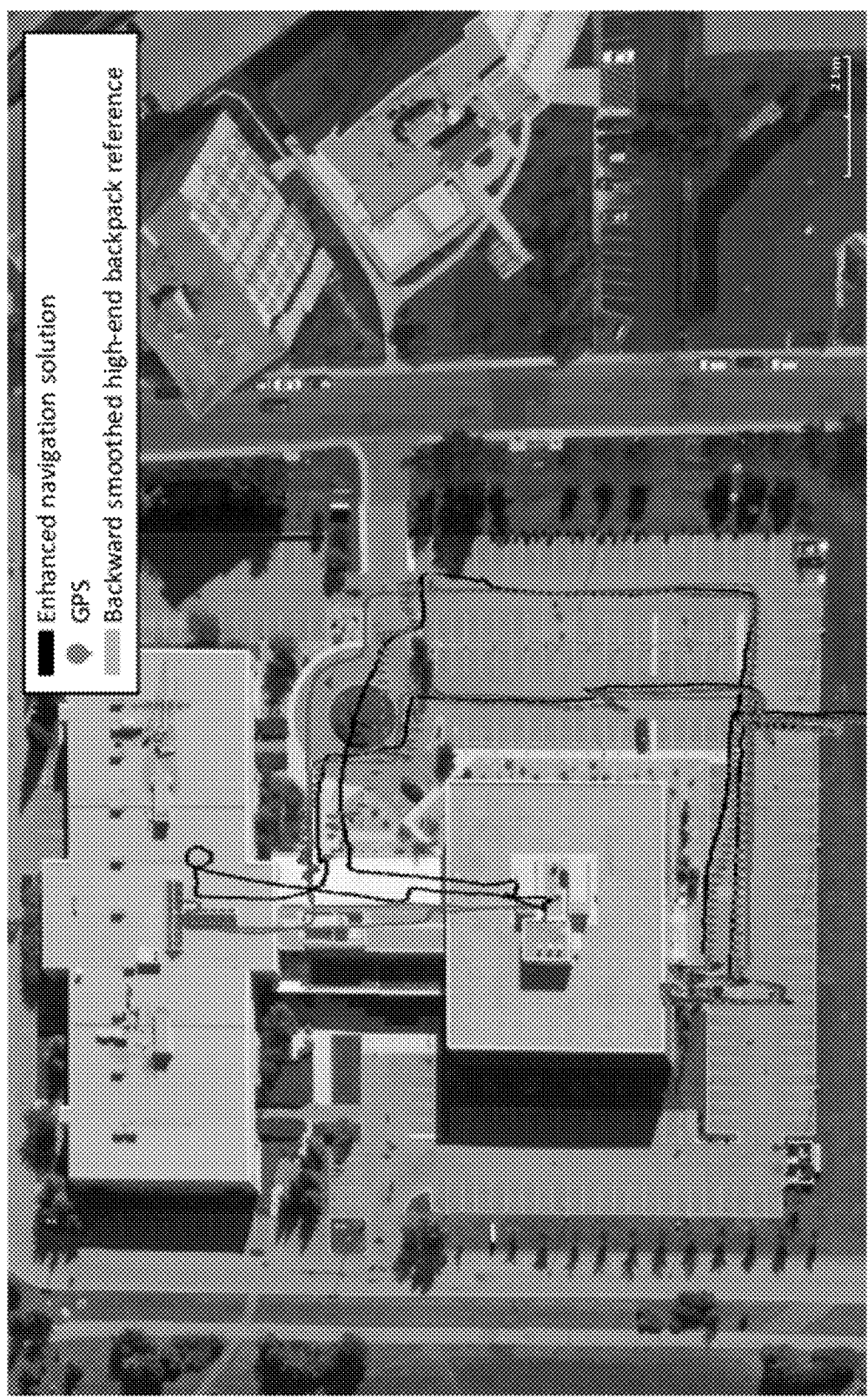
FIG. 13 shows an exemplary outdoor/indoor walking trajectory where the device was used with different use cases with varying misalignments and where the estimation of misalignments using all the attitude and misalignment modules from Embodiments 1 to 5 of the present method were being used.

FIG. 13 shows a sample outdoor/indoor walking trajectory where the device is used with the different use cases with varying misalignments. FIG. 13 shows the GPS positions when available as dots, the navigation solution using the present method is presented in black, and the reference solution is provided in grey. In this trajectory, the navigation solution presented in red is using all the attitude and misalignment modules from Embodiments 1 to 5 of the present method. The reference solution is using a backward smoothed solution from a high end tactical grade system comprising a NovAtel OEM4 GPS receiver and a Honeywell HG1700 IMU, fixed inside a special backpack, which was carried by the user in a fixed orientation.

Figure 14:
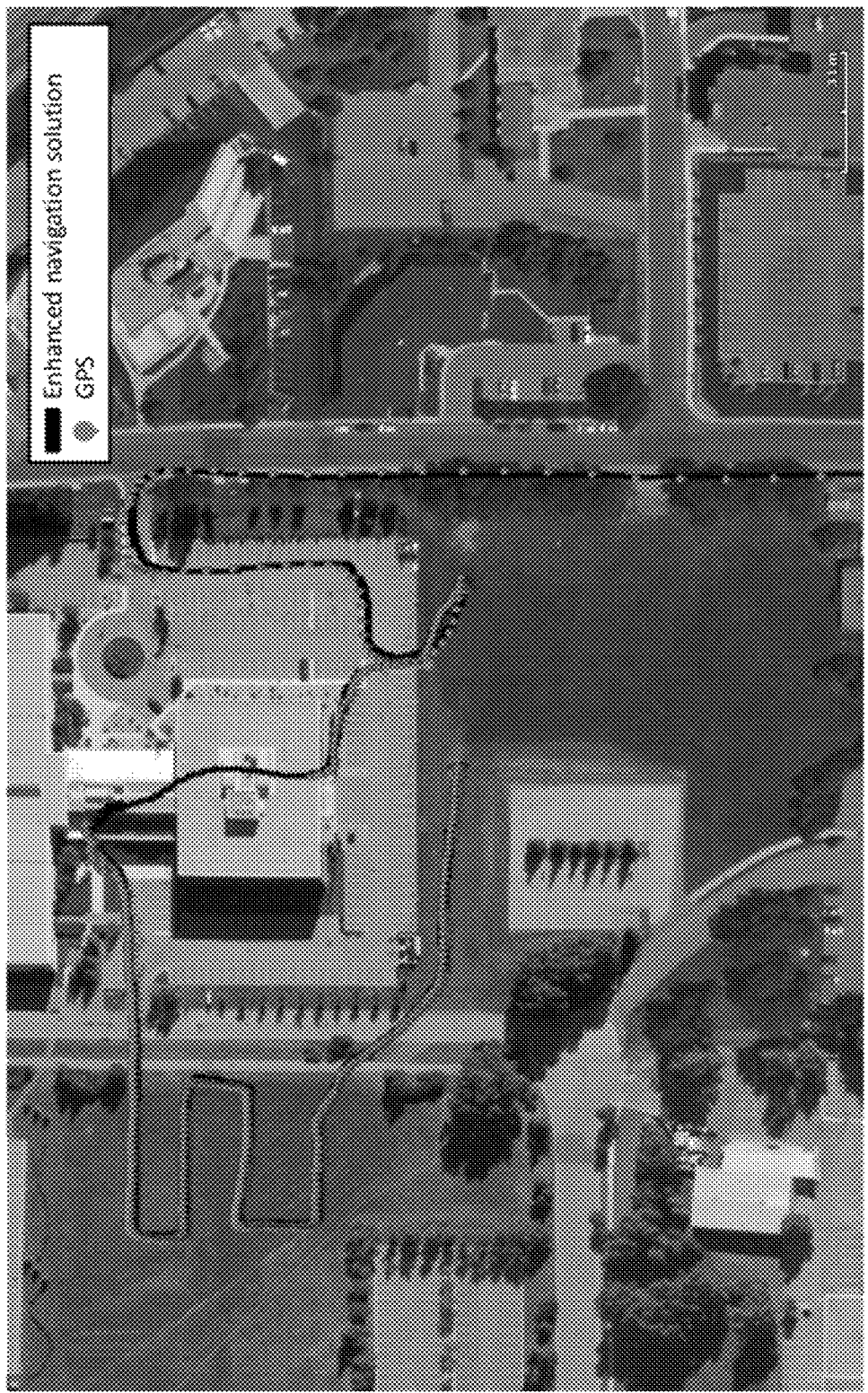
FIG. 14 shows an exemplary outdoor/indoor walking and driving trajectory where the device was used with different use cases with varying misalignments and where the estimation of misalignments using all the attitude and misalignment modules from Embodiments 1 to 6 of the present method were being used; and Table 1 shows common examples of specific misalignment angles based on absolute roll and pitch of the smart phone

FIG. 14 shows another sample outdoor/indoor walking and driving trajectory with the device being used with different use cases with varying misalignments. FIG. 14 shows the GPS positions when available as dots, and the navigation solution using the present method in black. In this trajectory, the estimation of misalignments is using all the attitude and misalignment modules from Embodiments 1 to 6 of the present method.

The embodiments of the invention in which an exclusive property or privelege is claimed are defined as follows:

1. A method for enhancing a navigation solution of a device and a platform, wherein the method is operable when mobility of the device is constrained within the platform and when mobility of the device is unconstrained within the platform, the method comprising:
   estimating an absolute heading of the platform and a standard deviation thereof by using a time rate of change of received signal strength (RSS) of wireless signals received by a wireless receiver of the device from a wireless communication system having at least one access point.

2. The method of claim 1, wherein the platform is a vehicle, a vessel or a person and the method is operable when the platform is a vehicle, a vessel or a person.

3. The method of claim 1, wherein the device comprises at least three accelerometers and wherein said accelerometers have quality specifications, further comprising:
   calculating roll and pitch of the device using specific forces measured at the device, and calculating a standard deviation of the roll and pitch of the device using the specific forces measured at the device and the quality specifications of the at least three accelerometers.

4. The method of claim 1, wherein the wireless signals are from a WiFi network.

5. The method of claim 1, wherein the method further comprises reducing noise of the RSS of the wireless signals.

6. The method of claim 1, wherein the method comprises the following steps:
   a) obtaining position coordinates of the device;
   b) obtaining a distance traveled by the platform until a threshold distance is obtained;
   c) measuring the RSS of the wireless signals from the at least one access point at the device during the time the distance is traveled by the platform;
   d) obtaining the location of the at least one access point having the RSS of the wireless signals detected at the device;
   e) calculating the time rate of change of the RSS of the wireless signals for the distance traveled by the platform;
   f) utilizing the calculated rate of change of the RSS of the wireless signals to determine an access point angle from each at least one access point to the platform;
   g) utilizing the access point angles to estimate heading ranges of the platform; and
   h) estimating the absolute heading of the platform utilizing the estimated heading ranges and calculating the standard deviation for the absolute heading of the platform.

7. The method of claim 6, wherein the position coordinates of the device are obtained from the navigation solution of the device.

8. The method of claim 6, wherein the location of the at least one access point is obtained from a database.

9. The method of claim 6, wherein the method further comprises reducing noise of the RSS of the wireless signals.

10. The method of claim 6, wherein the method further comprises utilizing a clustering technique to filter out outliner access point angles.

11. The method of claim 10, wherein the clustering technique used is k-mean clustering algorithm.

12. The method of claim 1, wherein the method utilizes a measurement-based estimation technique to obtain velocity of the platform and standard deviations thereof.

13. The method of claim 12, wherein the method utilizes the velocity of the platform and the standard deviations thereof to calculate the absolute heading of the platform and the standard deviation thereof.

14. The method of claim 12 or 13, wherein the measurement-based estimation technique is a Maximum Likelihood based technique or a Least Squares based technique.

15. The method of claim 12 or 13, wherein the method further comprises the following steps:
   a) measuring and saving the RSS of the wireless signals from the at least one access point at the device;
   b) obtaining the location of the at least one access points having the RSS of the wireless signals detected at the device;
   c) calculating the time rate of change of the RSS of the wireless signals;
   d) obtaining the position coordinates of the device;
   e) applying the measurement-based estimation technique using the measured RSS of the wireless signals and the time rate change of the RSS of the wireless signals to estimate the velocity of the platform and the standard deviations thereof; and
   f) estimating the absolute heading of the platform and standard deviations thereof using the velocity of the platform and the standard deviations thereof.

16. The method of claim 15, wherein the location of the at least one access point is obtained from a database.

17. The method of claim 15, wherein the position coordinates of the device are obtained from the navigation solution of the device.

18. The method of claim 15, wherein the method further comprises reducing noise of the RSS of the wireless signals.

19. The method of claim 15, wherein the measurement-based estimation technique is a Maximum Likelihood based technique or a Least Squares based technique.

20. The method of claim 1, wherein the absolute heading of the platform and standard deviations thereof is estimated using a measurement-based estimation technique.

21. The method of claim 20, wherein the measurement-based estimation technique is a Maximum Likelihood based technique or a Least Squares based technique.

22. The method of claim 20, wherein the method comprises the following steps:
   a) measuring and saving the RSS of the wireless signals from the at least one access point at the device;

b) obtaining the location of the at least one access point having the RSS of the wireless signals detected at the device;
c) calculating the time rate of change of the RSS of the wireless signals;
d) obtaining the position coordinates of the device;
e) obtaining a speed of the platform from the navigation solution on the device or from any other source of speed readings if available;
f) calculating an angle of arrival from the at least one access points to the device or measuring it if such a measurement is available; and
g) applying the measurement-based estimation technique using the measured RSS of the wireless signals and the time rate change of the RSS of the wireless signals to estimate the absolute heading of the platform heading and standard deviations thereof.

23. The method of claim 22, wherein the location of the at least one access point are obtained from a database.

24. The method of claim 22, wherein the position coordinates of the device are obtained from the navigation solution of the device.

25. The method of claim 22, wherein the method further comprises reducing noise of the RSS of the wireless signals.

26. The method of claim 22, wherein the measurement-based estimation technique is a Maximum Likelihood based technique or a Least Squares based technique.

27. The method of claim 1, wherein the method consists of the following steps:
a) measuring and saving the RSS of the wireless signals from the at least one access point at the device;
b) obtaining the location of the at least one access point having the RSS of the wireless signals detected at the device;
c) calculating the time rate of change of the RSS of the wireless signals;
d) obtaining the position coordinates of the device;
e) obtaining a speed of the platform from the navigation solution on the device or from any other source of speed readings if available;
f) calculating an angle of arrival from the at least one access points to the device or measuring it if such a measurement is available;
g) calculating a possible platform heading for each at least one access points whose RSS of the wireless signals is available to the device using the measured RSS of the wireless signals and the time rate change of the RSS of the wireless signal; and
h) estimating the absolute heading of the platform as a function of each of the possible platform headings and calculating the standard deviation of the absolute heading of the platform from the standard deviations of the possible platform headings.

28. The method of claim 27, wherein the locations of the access points having RSS available to the device are obtained from a database.

29. The method of claim 27, wherein the position coordinates of the device are obtained from the navigation solution of the device.

30. The method of claim 27, wherein the method further comprises reducing noise of the RSS of the wireless signals.

31. The method of claim 1, wherein the device has motion sensors and wherein a source of absolute velocity is available, the method further comprising estimating heading misalignment between the device and the platform by:
a) obtaining motion sensors readings;
b) obtaining absolute velocity;
c) choosing multiple possible candidates of heading misalignment to cover a range of angular value ambiguity for the heading misalignment between the device and the platform, wherein the heading misalignment between the device and the platform is a difference between a heading of the device and a heading of the platform and wherein the heading of the device is a heading of a frame of the motion sensors within the device;
d) estimating motion sensor readings for each chosen candidate of heading misalignment based at least in part on the obtained absolute velocity;
e) performing at least one of:
   i) transforming the estimated motion sensor readings from a frame of the absolute velocity to the motion sensor frame and comparing the transformed estimated motion sensor readings for each chosen candidate of heading misalignment to the obtained motion sensor readings in the motion sensor frame; and
   ii) transforming the obtained motion sensor readings from the motion sensor frame to a frame of the absolute velocity and comparing the estimated motion sensor readings for each chosen candidate of heading misalignment to the transformed obtained motion sensor readings in the frame of the absolute velocity; and
f) assessing each chosen candidate of heading misalignment based on the comparison.

32. The method of claim 1, wherein the device comprises at least three accelerometers, further comprising:
estimating misalignment of heading between the device and the platform independent of the availability of absolute source of velocity or heading information.

33. The method of claim 1, further comprising:
calculating continued misalignment of heading between the device and the platform when a source of absolute velocity or heading information is available or interrupted.

34. The method of claim 1, wherein the device is configured to receive readings related to navigational information from the platform via a wired or wireless connection.

35. The method of claim 34, wherein the readings related to navigational information comprises a speed of the platform, wherein the misalignment between the device and the platform is not resolved, and wherein the speed information is used to resolve the misalignment, by using the speed information and assuming candidates of misalignment to determine candidate specific forces about the device and comparing the candidate specific forces to specific forces measured by the device.

36. The method of claim 1, wherein the device has a means of obtaining velocity information, wherein the misalignment between the device and the platform is resolved, and wherein the device uses the velocity information to resolve the pitch and roll of the device, by using the velocity information and assuming candidates of pitch and roll to determine candidate specific forces at the device and comparing the candidate specific forces to specific forces measured by the device.

37. The method of claim 1, wherein the device has a means of obtaining speed information, wherein the misalignment between the device and the platform is resolved, and wherein the device uses the speed information to resolve the pitch and roll of the device, by using the speed information and assuming candidates of pitch and roll to determine candidate specific forces at the device and comparing the candidate specific forces to specific forces measured by the device.

38. The method of claim 1, wherein the estimated absolute heading of the platform is used to enhance the navigation solution.

* * * * *